(12) United States Patent
Tamura

(10) Patent No.: US 11,430,392 B2
(45) Date of Patent: Aug. 30, 2022

(54) DISPLAY DEVICE AND ELECTRONIC APPARATUS

(71) Applicant: SEIKO EPSON CORPORATION, Tokyo (JP)

(72) Inventor: Tsuyoshi Tamura, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,834

(22) Filed: Dec. 23, 2020

(65) Prior Publication Data

US 2021/0201822 A1 Jul. 1, 2021

(30) Foreign Application Priority Data

Dec. 26, 2019 (JP) .............................. JP2019-235878

(51) Int. Cl.
*G09G 3/3275* (2016.01)
*G02B 27/01* (2006.01)

(52) U.S. Cl.
CPC ....... *G09G 3/3275* (2013.01); *G02B 27/0172* (2013.01); *G02B 2027/0178* (2013.01); *G09G 2330/028* (2013.01)

(58) Field of Classification Search
CPC ........... G09G 3/3275; G09G 2330/028; G09G 2310/0297; G09G 3/3291; G09G 2320/0233; G09G 2300/0819; G09G 3/3233; G02B 2027/0178; G02B 27/0172
See application file for complete search history.

(56) References Cited

U.S. PATENT DOCUMENTS

| 2011/0109611 | A1  | 5/2011 | Nakamura |            |
|--------------|-----|--------|----------|------------|
| 2013/0093653 | A1* | 4/2013 | Ota ...... | G09G 3/2096 |
|              |     |        |          | 345/76     |
| 2013/0093737 | A1* | 4/2013 | Ota ...... | G09G 3/3275 |
|              |     |        |          | 345/204    |
| 2013/0106676 | A1* | 5/2013 | Ono ...... | G09G 3/30  |
|              |     |        |          | 345/76     |
| 2013/0119412 | A1* | 5/2013 | Kasai .... | H01L 27/3262 |
|              |     |        |          | 257/E33.053 |
| 2014/0062989 | A1  | 3/2014 | Ebisuno et al. |       |

(Continued)

FOREIGN PATENT DOCUMENTS

JP  2017-146535 A   8/2017
WO  2009/122998 A1  10/2009

(Continued)

*Primary Examiner* — Ibrahim A Khan
(74) *Attorney, Agent, or Firm* — Oliff PLC

(57) ABSTRACT

In a display device, first to second data lines, first to second data transfer lines, first to fourth capacitance elements, a power supply line to which a fixed voltage is supplied, a first switch provided between the first data transfer line and the second capacitance element, a second switch provided between the power supply line and the second capacitance element, a third switch provided between the second data transfer line and the fourth capacitance element, a fourth switch provided between the power supply line and the fourth capacitance element, a first power supply supplying the fixed voltage to one end of the power supply line, and a second power supply supplying the fixed voltage to another end of the power supply line.

8 Claims, 14 Drawing Sheets

(56) References Cited

U.S. PATENT DOCUMENTS

| | | | |
|---|---|---|---|
| 2014/0160185 A1* | 6/2014 | Okuno | G09G 3/3233 |
| | | | 345/691 |
| 2015/0035735 A1* | 2/2015 | Kang | G09G 3/3258 |
| | | | 345/77 |
| 2016/0086549 A1* | 3/2016 | Eom | G06F 3/1423 |
| | | | 345/690 |
| 2017/0236471 A1* | 8/2017 | Ota | G09G 3/2092 |
| | | | 345/76 |
| 2017/0244970 A1 | 8/2017 | Tamura et al. | |
| 2018/0137820 A1* | 5/2018 | Ota | G09G 3/3266 |
| 2018/0261161 A1* | 9/2018 | Ota | G09G 3/3233 |
| 2018/0293944 A1* | 10/2018 | Kim | G09G 3/3233 |
| 2019/0304372 A1* | 10/2019 | Pyo | G09G 3/3258 |
| 2019/0392758 A1* | 12/2019 | Kim | H01L 29/78391 |
| 2020/0044009 A1* | 2/2020 | Kwak | H01L 27/3276 |
| 2020/0357327 A1* | 11/2020 | Lee | G09G 3/3225 |

FOREIGN PATENT DOCUMENTS

| | | |
|---|---|---|
| WO | 2012/014477 A1 | 2/2012 |
| WO | 2013/094104 A1 | 6/2013 |

\* cited by examiner

DISPLAY DEVICE AND ELECTRONIC APPARATUS

The present application is based on, and claims priority from JP Application Serial Number 2019-235878, filed Dec. 26, 2019, the disclosure of which is hereby incorporated by reference herein in its entirety.

BACKGROUND

1. Technical Field

The present invention relates to a display device and an electronic apparatus.

2. Related Art

A display device is known that uses an organic light-emitting diode (OLED), for example, as a display element. In this display device, a pixel circuit including the display element, a transistor, and the like is generally provided corresponding to a pixel of an image to be displayed. Further, a reduction in display size and a higher display definition are often required of the display device. In order to achieve both the reduction in display size and the higher display definition, since it is necessary to downsize the pixel circuit, a technology is conceived in which a display device is integrated on a semiconductor substrate made of silicon or the like, for example, (see, for example, JP-A-2017-146535).

However, in the above technology, when a position of a power supply provided at the substrate and wiring of a power supply line are not suitable, this leads to a deterioration in display quality.

SUMMARY

A display device according to an aspect of the present disclosure includes a first data line, a second data line, a first data transfer line corresponding to the first data line, a second data transfer line corresponding to the second data line, a first capacitance element holding a voltage of a data signal transferred to the first data transfer line, a second capacitance element electrically coupled to the first data line, a third capacitance element holding a voltage of a data signal transferred to the second data transfer line, a fourth capacitance element electrically coupled to the second data line, a power supply line to which a reference voltage is supplied, a first switch provided between the first data transfer line and the second capacitance element, a second switch provided between the power supply line and the second capacitance element, a third switch provided between the second data transfer line and the fourth capacitance element, a fourth switch provided between the power supply line and the fourth capacitance element, a first power supply supplying the reference voltage to one end of the power supply line, and a second power supply supplying the reference voltage to another end of the power supply line. In a first period, the first switch and the third switch are OFF and the second switch and the fourth switch are ON. In a second period subsequent to the first period, the first switch and the third switch are ON and the second switch and the fourth switch are OFF.

Further, a display device according to another aspect of the present disclosure includes a first data line, a second data line, a first data transfer line corresponding to the first data line, a second data transfer line corresponding to the second data line, a first capacitance element holding a voltage of a data signal transferred to the first data transfer line, a second capacitance element electrically coupled to the first data line, a third capacitance element holding a voltage of a data signal transferred to the second data transfer line, a fourth capacitance element electrically coupled to the second data line, a power supply line to which an initialization voltage is supplied, a first switch provided between the first data transfer line and the second capacitance element, a second switch provided between the power supply line and the first data line, a third switch provided between the second data transfer line and the fourth capacitance element, a fourth switch provided between the power supply line and the second data line, a first power supply supplying the initialization voltage to one end of the power supply line, and a second power supply supplying the initialization voltage to another end of the power supply line. In a first period, the first switch and the third switch are OFF and the second switch and the fourth switch are ON. In a second period subsequent to the first period, the first switch and the third switch are ON and the second switch and the fourth switch are OFF.

DESCRIPTION OF EXEMPLARY EMBODIMENTS

A display device according to embodiments of the present disclosure is described below with reference to the accompanying drawings. However, in each of the drawings, a size and a scale of each unit is different from the actual size and the actual scale of each unit as appropriate. Further, the embodiments described below are favorable specific examples, and various technically preferable limitations are applied, but the scope of the present disclosure is not limited to these modes unless there is a specific notation to limit the disclosure in the following description.

Figure 1:
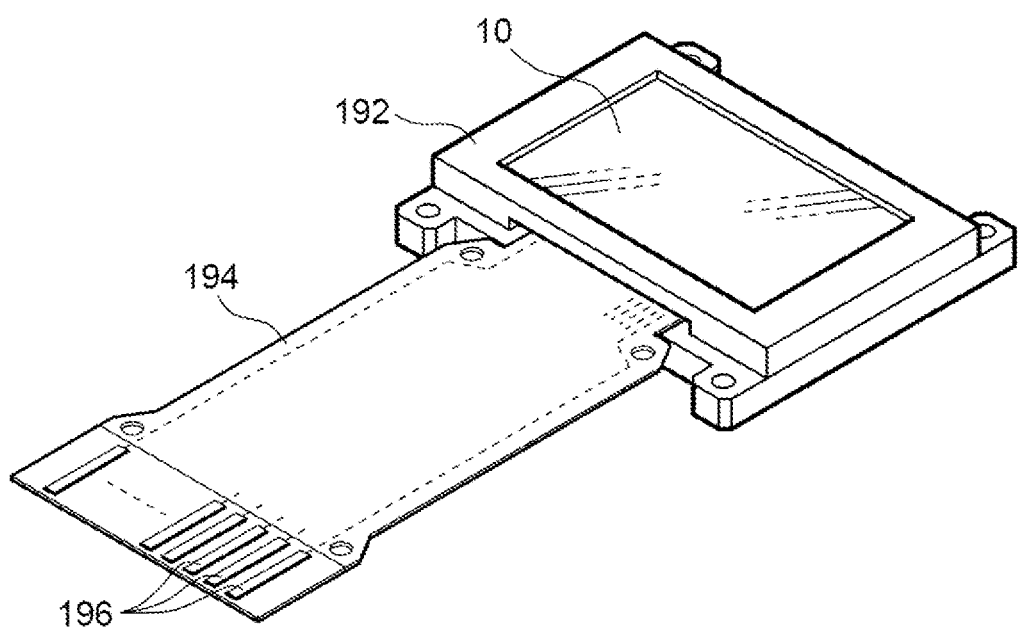
FIG. 1 is a perspective view illustrating a configuration of a display device according to a first embodiment.
Figure 2:
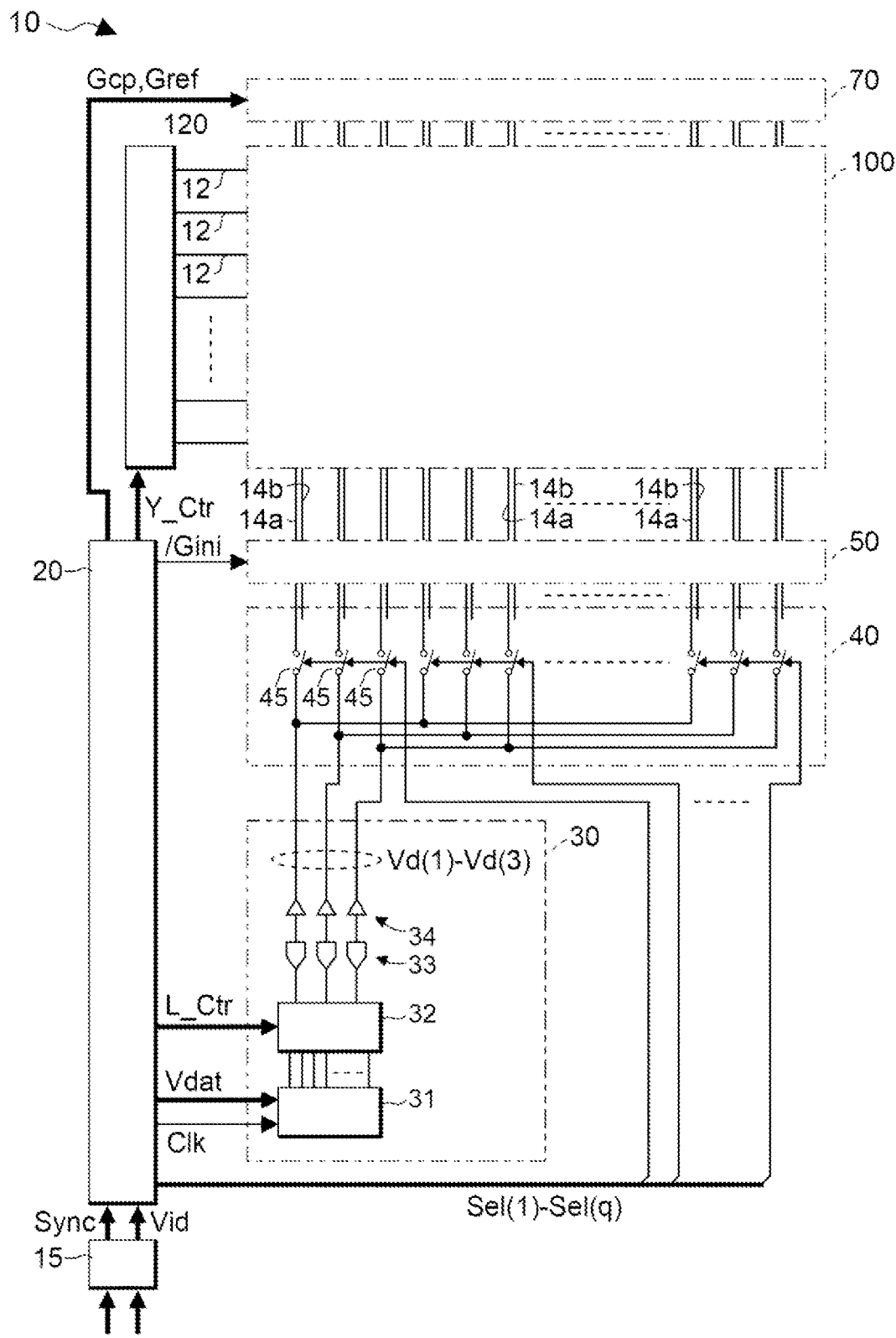
FIG. 2 is a block diagram illustrating a configuration of the display device.

FIG. 1 is a perspective view illustrating a configuration of a display device 10 according to a first embodiment, and FIG. 2 is a block diagram illustrating the configuration of the display device 10.

The display device 10 is a micro display panel that displays a color image in a head-mounted display (HMD), for example, and a plurality of pixel circuits, driving circuits that drive the pixel circuits, and the like are formed on a semiconductor substrate. The semiconductor substrate is typically a silicon substrate, but may be another semiconductor substrate.

The display device 10 is housed in a frame-shaped case 192 that is open in a display region, and is coupled to one end of a flexible printed circuit (FPC) substrate 194. A plurality of terminals 196 for coupling to an external host device are provided on the other end of the FPC substrate 194. Note that the host device outputs an image signal and a synchronization signal for display on the display device 10, using a differential signal such as a mini-low voltage differential signaling (mini-LVDS) system, for example.

As illustrated in FIG. 2, the display device 10 includes an interface 15, a control circuit 20, a data signal output circuit 30, a switch group 40, an initialization circuit 50, an auxiliary circuit 70, a display region 100, and a scanning line drive circuit 120.

In the display region 100, m rows of scanning lines 12 are provided along the left-right direction in FIG. 2, and (3q) columns of data lines 14b are provided along the vertical direction and so as to be electrically insulated from each of the scanning lines 12.

Note that m and q are integers equal to or greater than 2. Further, pixel circuits are provided corresponding to intersections between the m rows of scanning lines 12 and the (3q) columns of data lines 14.

The interface 15 receives the differential signal output from the host device and restores the differential signal to an image signal Vid and a synchronization signal Sync. Note that the interface 15 is a small amplitude differential interface, such as the mini-LVDS described above.

The control circuit 20 controls each of units on the basis of the image signal Vid and the synchronization signal Sync restored by the interface 15. The image signal Vid supplied in synchronization with the synchronization signal Sync specifies a gray scale level of pixels in an image to be displayed, for example, using 8 bits for each of RGB. Further, the synchronization signal Sync includes a vertical synchronization signal indicating a vertical scanning start of the image signal Vid, a horizontal synchronization signal indicating a horizontal scanning start, and a dot clock signal indicating timing of one pixel of the image signal.

The control circuit 20 generates control signals Gcp, Gref, Y_Ctr, /Gini, L_Ctr, S_Ctr, Sel (1) to Sel(q), and a clock signal Clk to control each of the units. Although not illustrated in FIG. 2, the control circuit 20 outputs a control signal /Gcp having a logical inverse relationship to the control signal Gcp and control signals /Sel(1) to /Sel(q) each having a logical inverse relationship to Sel(1) to Sel(q).

Further, the control circuit 20 appropriately processes the image signal Vid, up-converts the data to 10 bits, for example, and outputs the signal as an image signal Vdat. Note that the control circuit 20 includes a lookup table for converting the image signal Vid to the image signal Vdat, a register that stores various setting parameters, and the like.

The scanning line drive circuit 120 is a circuit that, in accordance with the control signal Y_Ctr, drives the pixel circuits arranged in the m rows and (3q) columns, taking each row as a unit.

The data signal output circuit 30 outputs a first data signal. Specifically, the data signal output circuit 30 outputs the first data signal of a voltage corresponding to the gray scale level of a pixel expressed by the pixel circuit, that is, of a pixel in the image to be displayed, which is the first data signal before compression of the voltage amplitude.

Note that in the present embodiment, the voltage amplitude of the first data signal output from the data signal output circuit 30 is compressed and supplied to the data line 14b as a second data signal. Thus, the second data signal after the compression is also a voltage corresponding to the gray scale level of the pixel. In other words, the voltage of the data line 14b is a voltage corresponding to the gray scale level of the pixel.

Further, the data signal output circuit 30 also has a function of performing parallel conversion for converting the serially supplied image signal Vdat into a plurality of phases ("3" phases, which is a coefficient of q in this example).

The data signal output circuit 30 includes a shift register 31, a latching circuit 32, a D/A converter circuit group 33, and an amplifier group 34.

The shift register 31 sequentially transfers the image signal Vdat that is serially supplied in synchronization with the clock signal Clk, and stores the image signals Vdat for one row, that is, (3q) in terms of the number of pixel circuits.

The latching circuit 32 latches the (3q) image signals Vdat stored in the shift register 31, in accordance with the control signal L_Ctr, and, in accordance with the control signal L_Ctr, parallel converts the latched image signals Vdat to the three phases and outputs the converted image signals Vdat.

The D/A converter circuit group 33 includes three digital to analog (D/A) converters. The three D/A converters convert the three-phase image signals Vdat output from the latching circuit 32 into analog signals.

The amplifier group 34 includes three amplifiers. The three amplifiers amplify the three-phase analog signals output from the D/A converter circuit group 33 and output the amplified signals as first data signals Vd(1), Vd(2), and Vd(3).

The control circuit 20 outputs the control signals Sel(1) to Sel(q), which sequentially exclusively become an H level prior to a writing period, as will be described below. In the present embodiment, the control circuit 20 outputs the control signals Sel(1) to Sel(q), which sequentially exclusively become the H level in an initialization period and a compensation period, among horizontal scanning periods.

Figure 3:
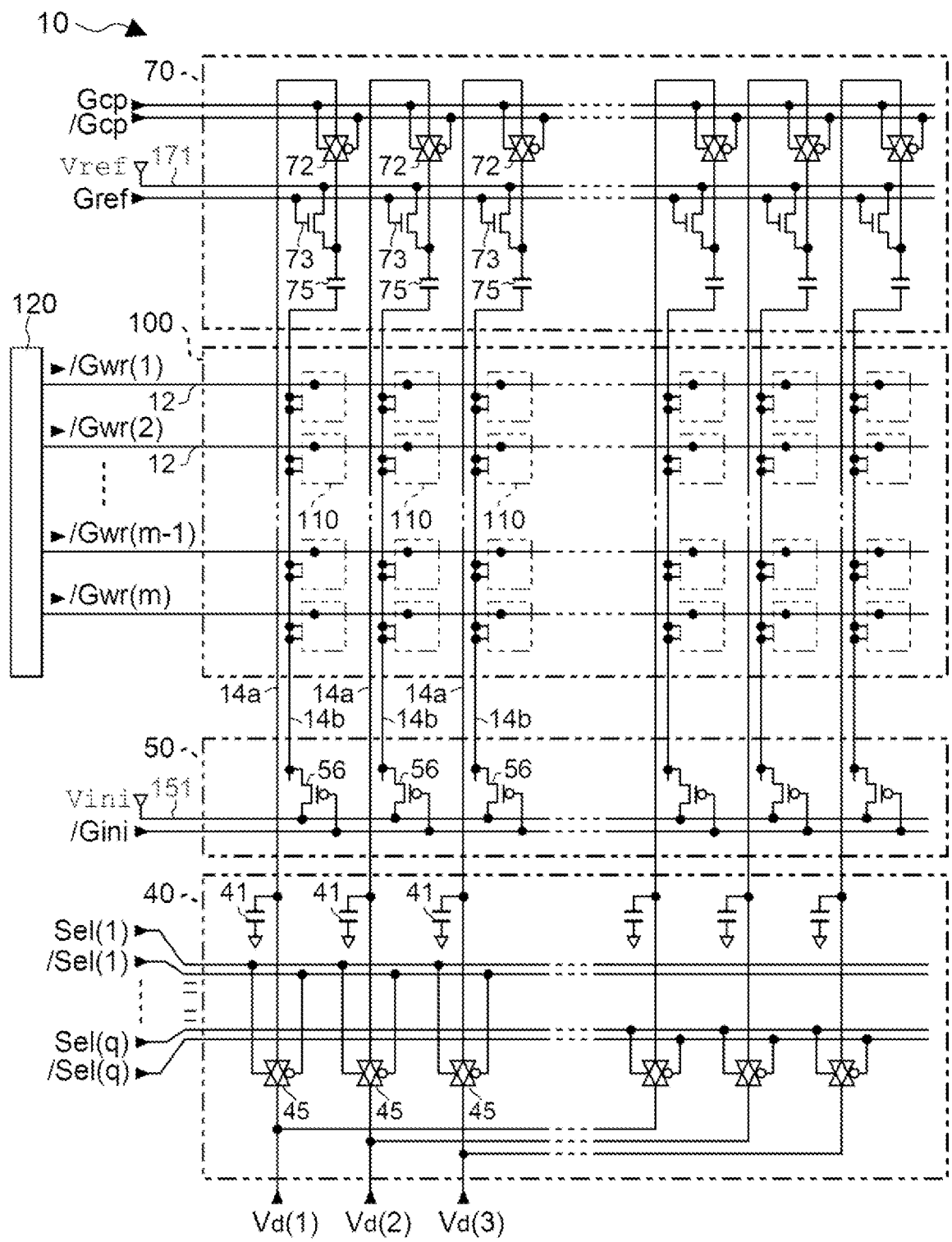
FIG. 3 is a circuit diagram of a configuration of main portions of the display device.

FIG. 3 is a circuit diagram illustrating a configuration of the switch group 40, the initialization circuit 50, the auxiliary circuit 70, and the display region 100 of the display device 10.

In the display unit 100, pixel circuits 110 corresponding to the pixels of the image to be displayed are arranged in a matrix. Specifically, the pixel circuits 110 are provided corresponding to the intersections between the m rows of scanning lines 12 and the (3q) columns of data lines 14. Thus, the pixel circuits 110 are arranged in a matrix having the m rows arranged vertically and the (3q) columns arranged horizontally in FIG. 3. Here, of the matrix array, in order to distinguish the rows, the rows may be referred to sequentially from the top in the drawings as rows 1, 2, 3, . . . , (m−1), and m. Similarly, in order to distinguish the matrix columns, the columns may be referred to sequentially from the left in the drawings as columns 1, 2, 3, . . . , (3q−1), and (3q).

Further, the data lines 14b are grouped every three columns in FIG. 2 and FIG. 3. Here, in order to generally describe the group, when an integer j that is from 1 to q is used, a total of three columns of the data lines 14b belong to a j-th group, when counting from the left, namely, a (3j−2)-th column, a (3j−1)-th column, and a (3j)-th column.

The three pixel circuits 110 corresponding to the intersection of the scanning line 12 in the same row and the three columns of the data lines 14b belonging to the same group respectively correspond to R (red), G (green), and B (blue) pixels, and these three pixels represent one dot of a color image to be displayed. In other words, in the first embodiment, the color of the one dot is represented by additive color mixing, by the three pixel circuits 110 corresponding to RGB.

The scanning line drive circuit 120 generates, in accordance with the control signal Y_Ctr, a scanning signal for sequentially scanning each of the rows of the scanning lines 12. Here, the scanning signals supplied to the scanning lines 12 in rows 1, 2, 3, . . . , (m−1), and m are respectively denoted by /Gwr(1), /Gwr(2), . . . , /Gwr(m−1), and /Gwr(m).

Note that, in addition to the scanning signals /Gwr(1) to /Gwr(m), the scanning line drive circuit 120 generates control signals synchronized with the scanning signals for each of the rows, and supplies the control signals to the display region 100, but this is not illustrated in FIG. 3.

In the display device 10, a data transfer line 14a is provided corresponding to the data line 14b.

Further, the switch group 40 is a collection of capacitance elements 41 provided for each of the data transfer lines 14a and transmission gates 45 provided for each of the data transfer lines 14a.

Of these, input ends of a number q of the transmission gates 45 corresponding to the columns 1, 4, 7, . . . , (3q−2) are coupled in common. Note that the first data signal Vd(1) is supplied to the input end in time series for each of the pixels.

Further, the input ends of the q transmission gates 45 corresponding to the columns 2, 5, 8, . . . , (3q−1) are coupled in common, and the first data signal Vd(2) is supplied in time series for each of the pixels.

Similarly, the input ends of the q transmission gates 45 corresponding to the columns 3, 6, 9, . . . , (3q) are coupled in common, and the first data signal Vd(3) is supplied in time series for each of the pixels.

An output end of the transmission gate 45 in a given one of the columns is coupled to one end of the data transfer line 14a corresponding to that column.

The three transmission gates 45 corresponding to the (3j−2)-th, (3j−1)-th, and (3j)-th columns belonging to the j-th group are ON between the input end and the output end when the control signal Sel(j) is at the H level (when the control signal /Sel(j) is at an L level).

Note that in FIG. 3, only the first group and the q-th group are illustrated due to limitations on paper, and the other groups are omitted. Further, the transmission gates 45 illustrated in FIG. 3 are simplified as simple switches in FIG. 2.

One end of the capacitance element 41 in a given column is coupled to the one end of the data transfer line 14a corresponding to that column, and the other end of the capacitance element 41 is grounded to a constant potential, such as a potential that is a reference for a zero voltage.

The auxiliary circuit 70 is a collection of transmission gates 72 provided for each of the columns, N-channel MOS type transistors 73 provided for each of the columns, and capacitance elements 75 provided for each of the columns.

Here, an input end of the transmission gate 72 corresponding to a given column is coupled to the other end of the data transfer line 14a, and an output end of the transmission gate 72 corresponding to the column is coupled to the drain node of the transistor 73 corresponding to that column and to one end of the capacitance element 75 corresponding to that column.

Further, in each of the columns, the control signal Gref is supplied to the gate node of the transistor 73, and the source node of the transistor 73 is coupled to a power supply line 171 of a voltage Vref. Note that in FIG. 3, the voltage Vref is supplied from the left end of the power supply line 171, but, as will be described below, the voltage Vref is also supplied from the right end of the power supply line 171.

The other end of the capacitance element 75 corresponding to the given column is coupled to one end of the data line 14b corresponding to that column.

The initialization circuit 50 is a collection of P-channel MOS type transistors 56 provided for each of the columns. In each of examples, the control signal /Gini is supplied to the gate node of the transistor 56, and the source node of the transistor 56 is coupled to a power supply line 151 of a voltage Vini. Further, the drain node of the transistor 56 corresponding to a given column is coupled to the data line 14b corresponding to that column. Note that in FIG. 3, the voltage Vini is supplied from the left end of the power supply line 151, but, as will be described below, the voltage Vini is also supplied from the right end of the power supply line 151.

In the present embodiment, the one end of the data transfer line 14a is coupled to the output end of the transmission gate 45 and the one end of the capacitance element 41, and the other end of the data transfer line 14a is coupled to the input end of the transmission gate 72. Since the display region 100 is positioned between the switch group 40 and the auxiliary circuit 70, the data transfer line 14a passes through the display area 100.

On the other hand, the first data signal supplied to the data transfer line 14a via the transmission gate 45 is supplied to the pixel circuit 110 as the second data signal via the transmission gate 72, the capacitance element 75, and the data line 14b.

Thus, via the data transfer line 14a, the first data signal output from the data signal output circuit 30 reaches the auxiliary circuit 70 that is positioned on the opposite side of the display region 100 from the data signal output circuit 30, is turned back, and is supplied to the pixel circuit 110 via the data line 14b as the second data signal.

In this configuration, a region in which the capacitance element 75 is provided and the data signal output circuit are positioned such that the display region 100 is interposed therebetween. Therefore, when the display region 100 is used as a reference, elements need not necessarily be concentrated in the region in which the data signal output circuit is provided. The display region 100 needs to be separated to a certain degree from four sides, and even in a region in which the data signal output circuit is not provided, a distance from the side is required to some extent. When the elements are concentrated in a region of the data signal output circuit and the periphery of the data signal output circuit, an area required by that regions increases, which may be an obstacle to downsizing. However, in the above configuration, the area required for that region is reduced, and downsizing can thus be achieved.

Figure 4:
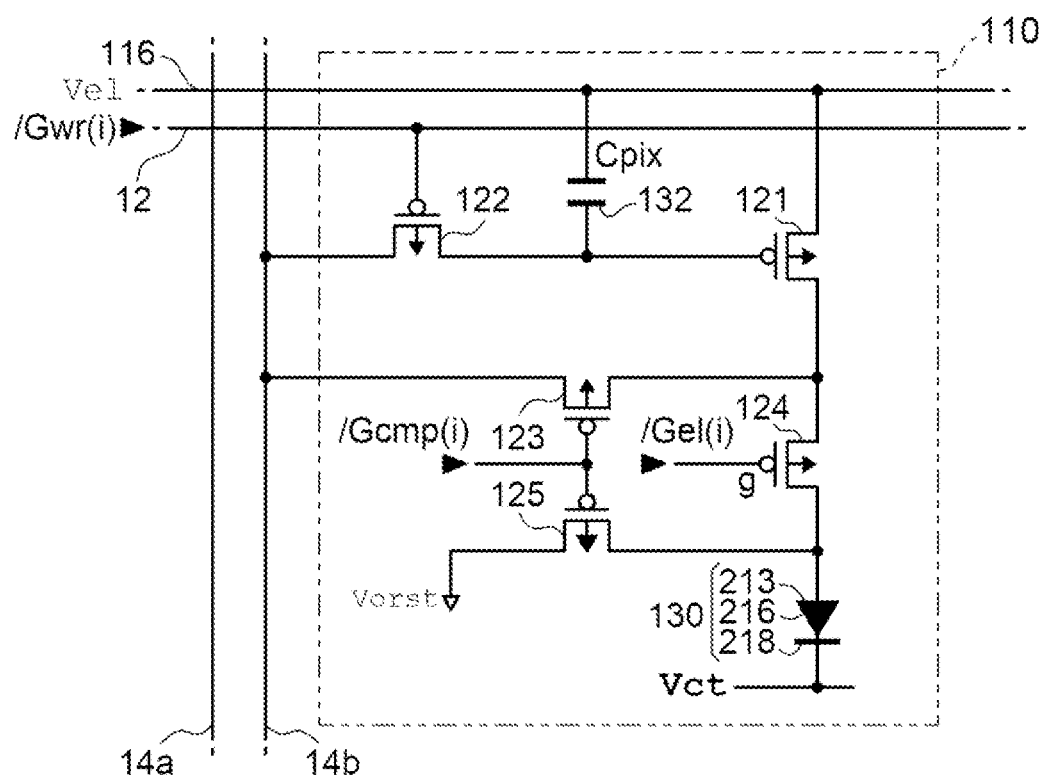
FIG. 4 is a diagram illustrating a configuration of a pixel circuit in the display device.

FIG. 4 is a diagram illustrating a configuration of the pixel circuit 110. The pixel circuits 110 arranged in the m rows and (3q) columns are electrically identical to each other. For this reason, the pixel circuit 110 will be described with reference to the i-th row, which is representative of one of the pixel circuits 110 corresponding to any of the columns.

As illustrated in FIG. 4, the pixel circuit 110 includes an OLED 130, P-channel transistors 121 to 125, and a capacitance element 132.

Further, in addition to the scanning signal /Gwr(i), control signals /Gel(i) and /Gcmp(i) are supplied from the scanning line drive circuit 120 to the i-th pixel circuit 110.

The OLED 130 is an example of a display element, in which a light emission function layer 216 is interposed between a pixel electrode 213 and a common electrode 218. The pixel electrode 213 functions as an anode and the common electrode 218 functions as a cathode. Further, the common electrode 218 has optical transparency.

When a current flows from the anode to the cathode in the OLED 130, holes injected from the anode and electrons injected from the cathode are recombined in the light emission function layer 216, thus generating excitons and generating white light. The white light generated at this time is resonated by an optical resonator configured by a reflective film and a half mirror (not illustrated), and is emitted at a resonance wavelength set in accordance with one of the colors of RGB. A color filter corresponding to the color is provided on the emission side of the light from the optical resonator. Thus, the light emitted from the OLED 130 is visible to an observer as a result of coloration by the optical resonator and the color filter.

Note that the OLED 130 provided in the pixel circuit 110 is a smallest unit of the display image. One of the pixel circuits 110 includes one of the OLEDs 130. A given one of the pixel circuits 110 is controlled independently from the other pixel circuits 110, and the OLED 130 emits light in a color corresponding to the pixel circuit 110 to represent one of the three primary colors.

In other words, since the one pixel circuit 110 represents one of the three primary colors among the colors to be displayed, strictly speaking, the pixel circuit 110 should be referred to as a subpixel circuit, but is referred to as a pixel circuit in order to simplify the description. Note that when the display device 10 simply displays only a light and dark monochrome image, the color filter may be omitted.

In the transistor 121, the gate node is coupled to the drain node of the transistor 122, the source node is coupled to a power supply line 116 of a voltage Vel, and the drain node is coupled to the source node of the transistor 123 and to the source node of the transistor 124. Note that, in the capacitance element 132, one end is coupled to the gate node of the transistor 121, and the other end is coupled to a constant voltage, such as the power supply line 116 of the voltage Vel, for example. As a result, the capacitance element 132 holds the voltage of a gate node g in the transistor 121.

Note that, as the capacitance element 132, a capacitor which is parasitic to the gate node of the transistor 121 may be used, or a capacitor formed by interposing an insulating layer between mutually different conductive layers in a silicon substrate may be used.

Of the transistor 122 of the pixel circuit 110 in the i-th row and in any of the columns, the gate node is coupled to the scanning line 12 of the i-th row, and the source node is coupled to the data line 14b of that column.

Of the transistor 123 of the pixel circuit 110 in the i-th row and in any of the columns, the control signal /Gcmp(i) is supplied to the gate node, and the drain node is coupled to the data line 14b in that column.

Of the transistor 124 of the pixel circuit 110 in the i-th row and in any of the columns, the control signal /Gel(i) is supplied to the gate node, and the drain node is coupled to the pixel electrode 213, which is the anode of the OLED 130, and to the drain node of the transistor 125.

Of the transistor 125 of the pixel circuit 110 in the i-th row and in any of the columns, the control signal /Gcmp(i) is supplied to the gate node, and the source node is coupled to a power supply line of a voltage Vorst.

Note that the common electrode 218 that functions as the cathode of the OLED 130 is coupled to a power supply line of a voltage Vct. Further, since the display panel 10 is formed on the silicon substrate, a substrate potential of each of the transistors 121 to 125 is assumed to correspond to the voltage Vel, for example.

Figure 5:
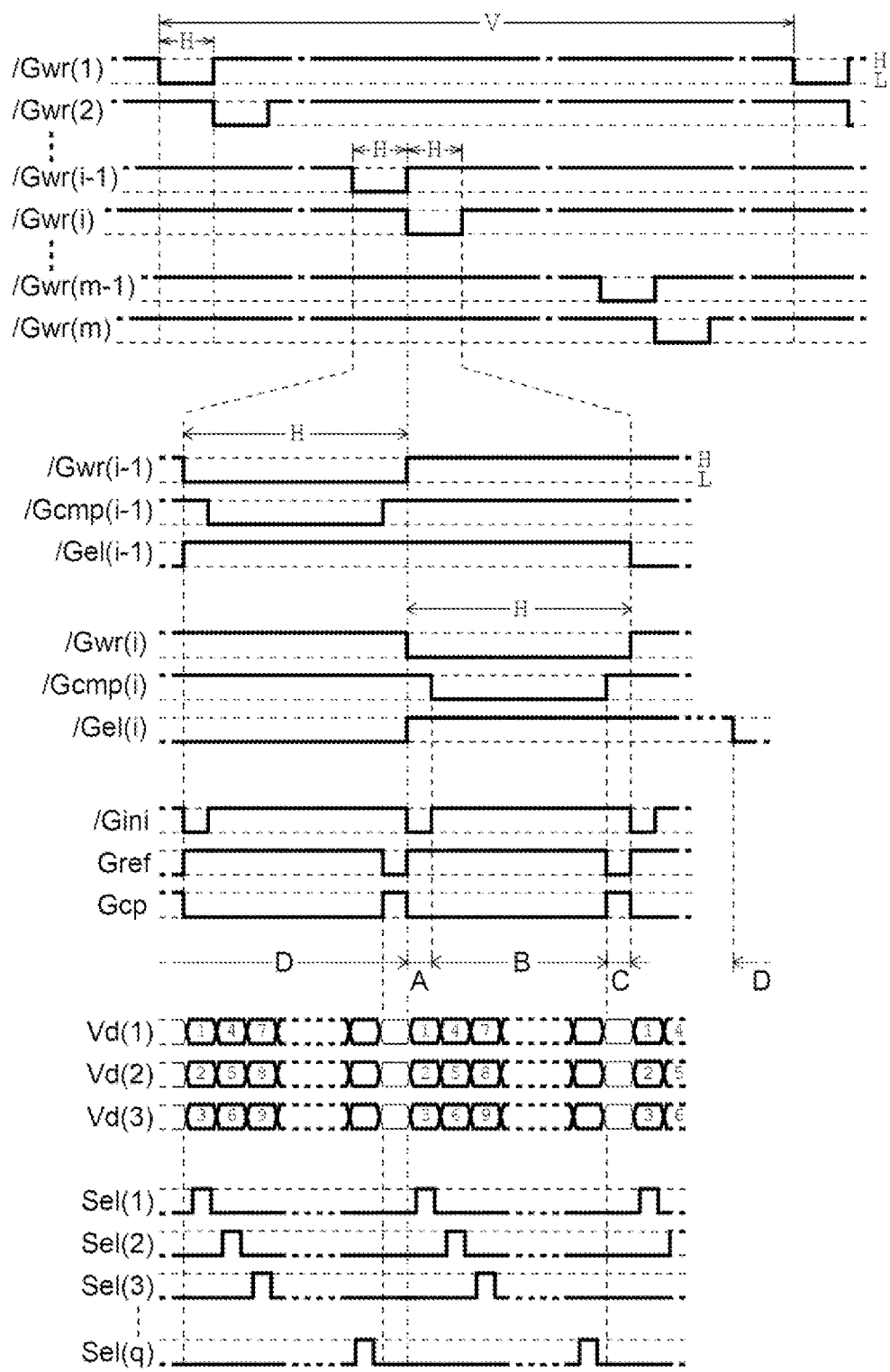
FIG. 5 is a timing chart illustrating operations of the display device.

FIG. 5 is a timing chart for describing operations of the display device 10.

In the display device 10, over a period of one frame (F), the rows 1, 2, 3, . . . , m are scanned in that order. Specifically, as illustrated in FIG. 5, the scanning line drive circuit 120 causes the scanning signals /Gwr(1), /Gwr(2), . . . , /Gwr(m−1), and /Gwr(m) to be sequentially exclusively at the L level for each of a horizontal scanning period (H).

Note that in the present description, the period of one frame refers to a period required to display one segment of the image specified by the image signal Vid. When the length of the period of one frame is the same as the vertical synchronization period, for example, if the frequency of the vertical synchronization signal included in the synchronization signal Sync is 60 Hz, then the period of one frame is 16.7 milliseconds corresponding to one cycle of the vertical synchronization signal. Further, in FIG. 5, a vertical scale indicating the voltage is not necessarily aligned over each of the signals.

Operations in the horizontal scanning period (H) are the same for the pixel circuits in unselected rows.

Further, operations of the pixel circuits 110 in the rows 1 to (3q) scanned during the horizontal scanning period (H) are also substantially the same. Below, the description will be given while focusing attention on the pixel circuit 110 in the i-th row and the (3j−2)-th column.

In the first embodiment, the horizontal scanning period (H) is divided into three main periods, namely, an initialization period (A), a compensation period (B), and a writing period (C). Further, a light emission period (D) is further added as an operation of the pixel circuit 110, in addition to the above-described three periods.

In the initialization period (A) in each of the horizontal scanning periods (H), the control signal /Gini is at the L level, the control signal /Gref is at the H level, and the control signal Gcp is at the L level. Further, in the compensation period (B), the control signal /Gini is at the H level, the control signal /Gref maintains the H level, and the control signal Gcp maintains the L level. In the writing period (C), the control signal /Gini maintains the H level, the control signal /Gref is at the L level, and the control signal Gcp is at the H level.

Note that the light emission period (D) of the pixel circuit 110 in the i-th row refers to a period in which the control signal /Gel(i) is at the L level.

In the horizontal scanning period (H) in which the scanning line 112 in the i-th row is selected, the scanning signal /Gwr(i) is at the L level, and thus the transistor 122 in the i-th pixel circuit 110 is ON. Further, in the horizontal scanning period (H), the control signal /Gel is at the H level, and thus the transistor 124 in the pixel circuit 110 is OFF.

Figure 6:
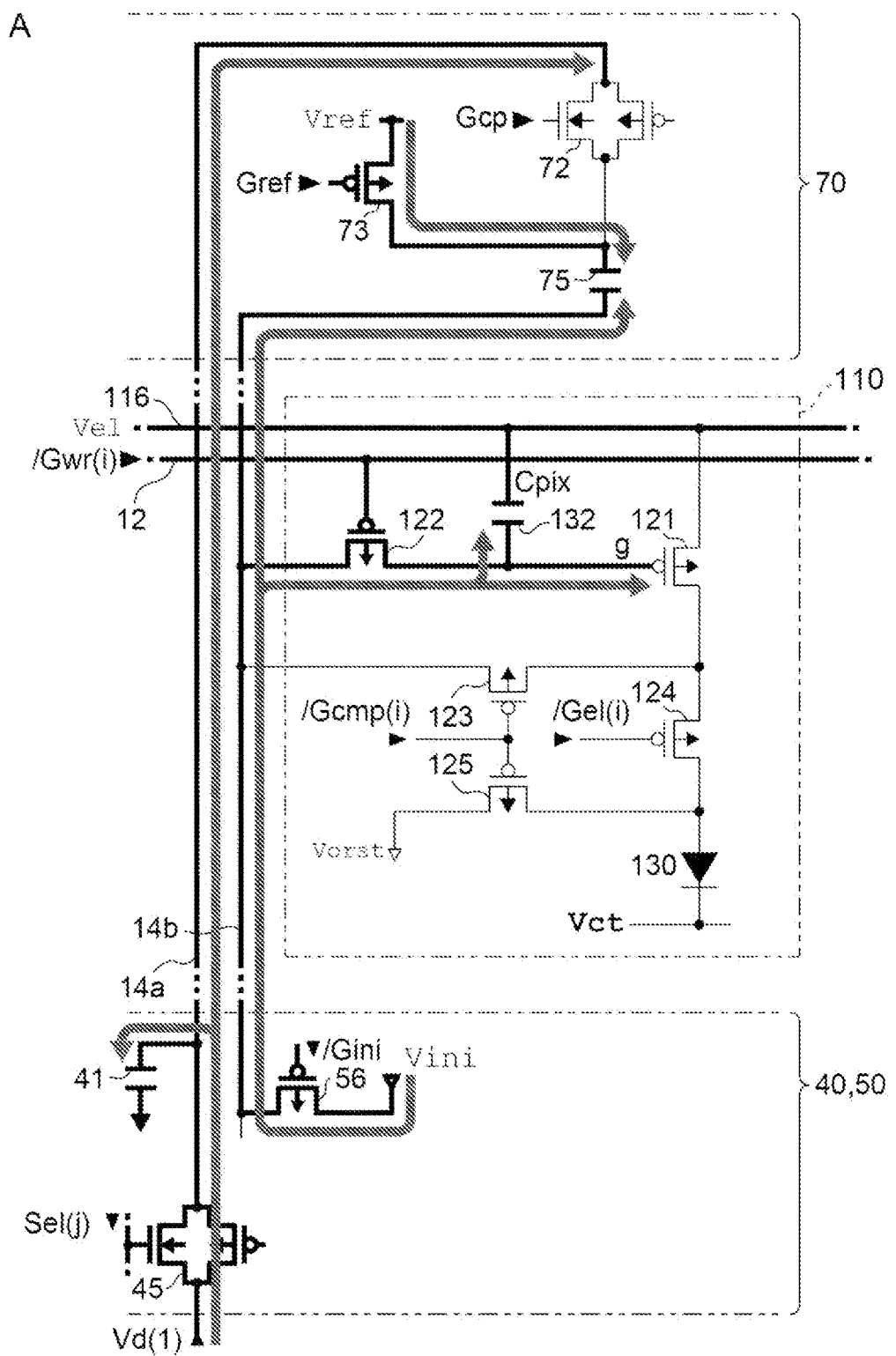
FIG. 6 is a diagram for describing the operations of the display device.

In the initialization period (A) of the horizontal scanning period (H), the transistor 56 is ON as a result of the control signal /Gini being at the L level. Thus, as illustrated in FIG. 6, the data line 14b, the gate node g of the transistor 121, the one end of the capacitance element 132, and the other end of the capacitance element 75 are initialized to the voltage Vini. In the initialization period (A), the transistors 123 and 125 are OFF as a result of the control signal /Gcmp(i) being at the H level. In the initialization period (A), the transistor 73 is ON as a result of the control signal Gref being at the L level, and thus, as illustrated in FIG. 6, one end of the capacitance element 75 is initialized to the voltage Vref.

Figure 7:
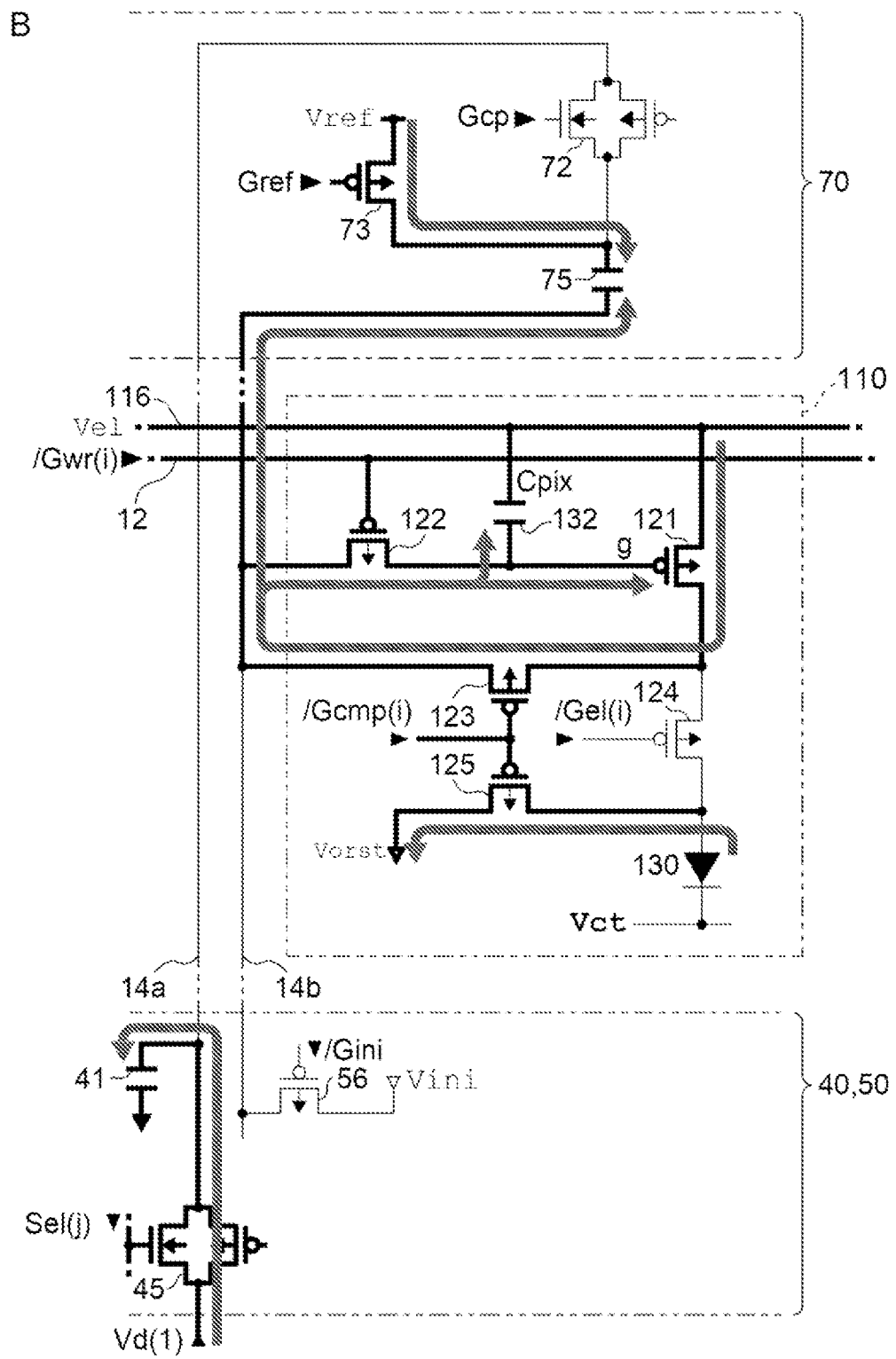
FIG. 7 is a diagram for describing the operations of the display device.

Next, of the horizontal scanning period (H) for which the scanning line 112 in the i-th row is selected, in the compensation period (B), the control signal /Gcmp(i) is at the L level in a state in which the scanning signal /Gwr(i) is at the L level. Thus, in the pixel circuit 110 in the i-th row and the (3j−2)-th column, as illustrated in FIG. 7, the transistor 123 is ON in a state in which the transistor 121 is on. Thus, the transistor 121 is in a state in which the gate node and the drain node are coupled, that is, in a diode coupled state. As a result, the voltage between the gate node and the source node in the transistor 121 converges to a threshold voltage of the transistor 121. Here, when the threshold voltage is denoted by Vth for convenience, the gate node g of the transistor 121 converges to a voltage (Vel−Vth) corresponding to the threshold voltage Vth.

Note that, in the compensation period (B), the gate node and the drain node of the transistor 121 are coupled to the data line 14b, and thus, the voltage of the data line 14b is also the voltage (Vel−Vth). In the compensation period (B), the control signal Gref is at the H level and the transistor 73 is on, and thus, in the capacitance element 75, one end is the voltage Vref and the other end is the voltage (Vel−Vth).

Further, in the compensation period (B), the transistor 125 is ON as a result of the control signal /Gcmp(i) being at the L level, and thus the anode (pixel electrode) of the OLED 130 is reset to the voltage Vorst.

The control signals Sel(1) to Sel(q) are sequentially exclusively at the H level in the initialization period (A) and the compensation period (B). Note that although not illustrated in FIG. 5, FIG. 6, and FIG. 7, the control signals /Sel(1) to /Sel(q) are sequentially exclusively at the L level in synchronization with the control signals Sel(1) to Sel(q) in the initialization period (A) and the compensation period (B).

On the other hand, when, of the control signals Sel(1) to Sel(q), the control signal Sel(j) is at the H level, for example, the data signal output circuit 30 outputs the first data signals Vd(1) to Vd(3) of the three pixels corresponding to the intersections between the scanning line 12 in the i-th row and the data lines 14b belonging to the j-th group. More specifically, in a period in which the control signal Sel(j) is at the H level, the data signal output circuit 30 outputs the first data signal Vd(1) corresponding to the pixel of the i-th row and the (3j−2)-th column, outputs the first data signal Vd(2) corresponding to the pixel of the i-th row and the (3j−1)-th column, and outputs the first data signal Vd(3) corresponding to the pixel of the i-th row and the (3j)-th column.

As a specific example, when j is "2", in a time period in which the control signal Sel(2) is at the H level, the data signal output circuit 30 outputs the first data signal Vd(1) corresponding to the pixel of the i-th row and the fourth column, outputs the first data signal Vd(2) corresponding to the pixel of the i-th row and the fifth column, and outputs the first data signal Vd(3) corresponding to the pixel of the i-th row and the sixth column.

In this way, when the control signals Sel(1) to Sel(q) are sequentially exclusively at the H level, the voltage of the first data signal corresponding to each of the pixels is held in the respective capacitance elements 41 corresponding to the first column to the (3q)-th column.

Note that in FIG. 6, a state is illustrated in which the control signal Sel(j) corresponding to the j-th group to which the pixel circuit 110 belongs is at the H level in the initialization period (A), and the voltage of the first data signal Vd(1) is held by the capacitance element 41.

Further, in FIG. 7, a state is illustrated in which the control signal Sel(j) corresponding to the j-th group is at the H level in the compensation period (B), and the voltage of the first data signal Vd(1) is held by the capacitance element 41.

Next, of the horizontal scanning period (H) for which the scanning line 112 in the i-th row is selected, in the writing period (C), the control signal /Gcmp(i) is at the H level in a state in which the scanning signal /Gwr(i) is at the L level. Thus, in the pixel circuit 110 in the i-th row and the (3j−2)-th column, the transistors 123 and 125 are OFF.

Figure 8:
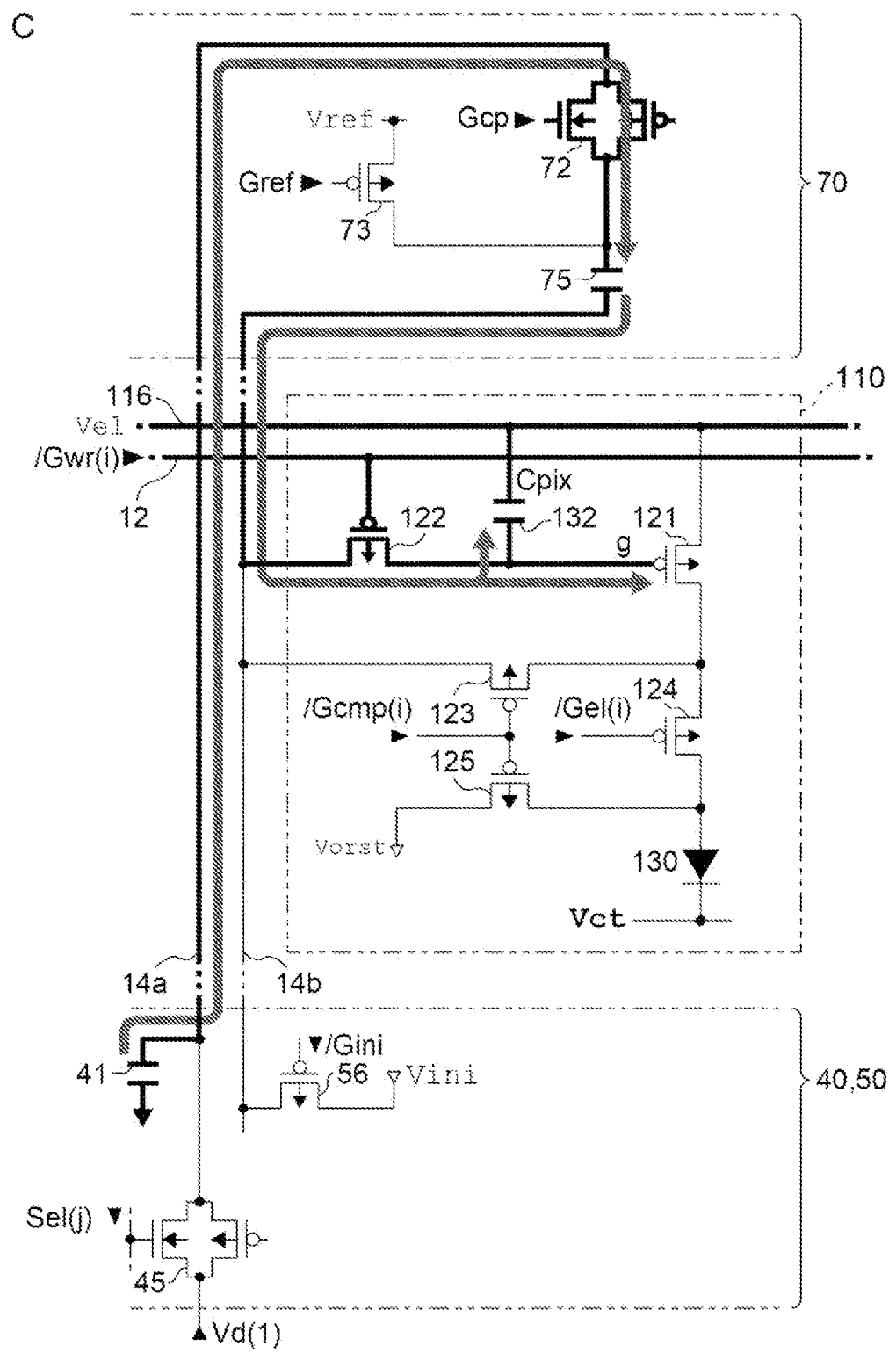
FIG. 8 is a diagram for describing the operations of the display device.
Figure 9:
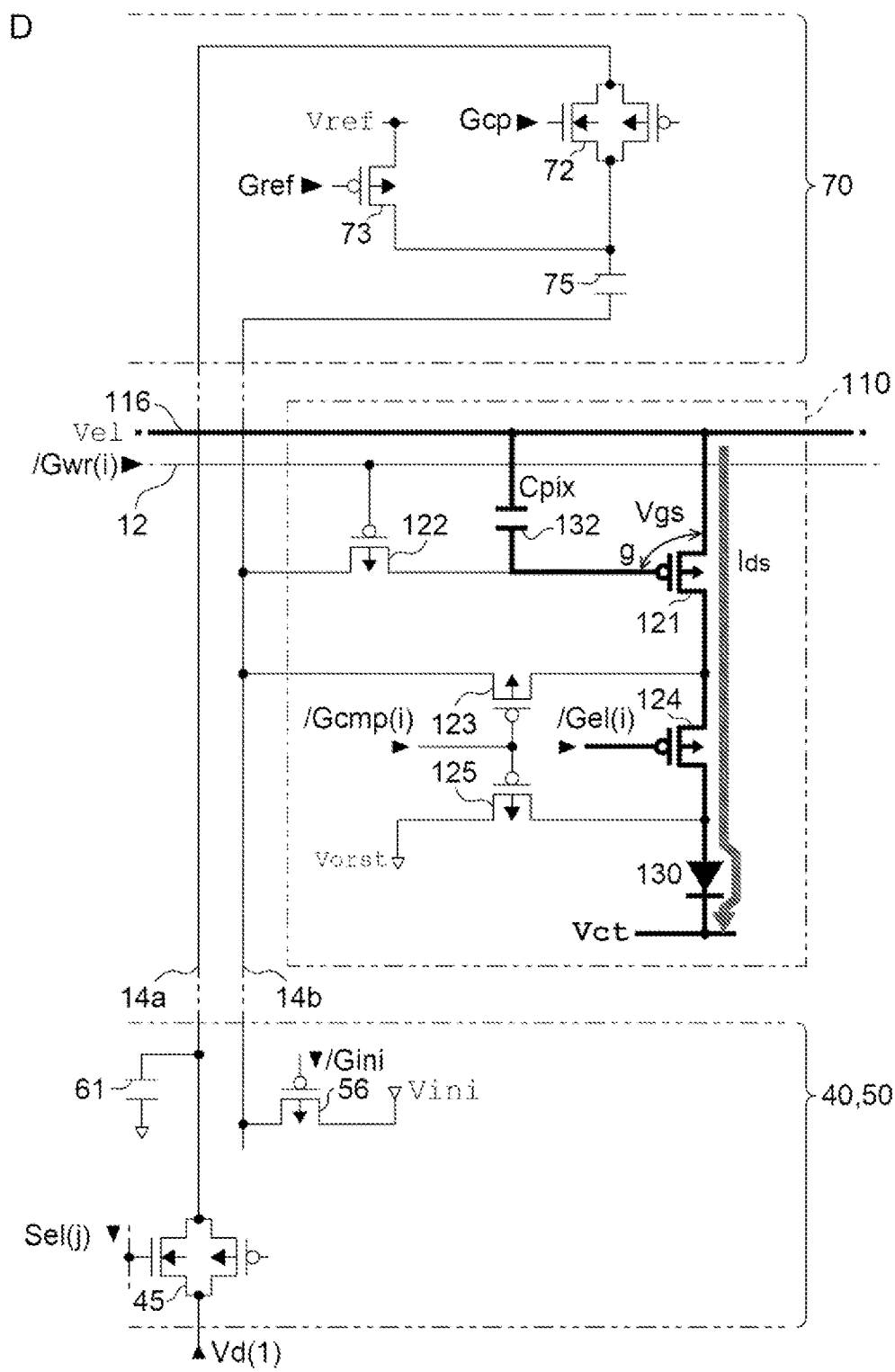
FIG. 9 is a diagram for describing the operations of the display device.

Further, in the writing period (C), as illustrated in FIG. 8, since the control signal Gref is at the L level, the transistor 73 is OFF, and since the control signal Gcp is at the H level (the control signal /Gcp is at the L level), the transmission gate 72 is ON. As a result, one end of the capacitance element 75 shifts from the voltage Vref to the voltage held by the capacitance element 41. This voltage shift is transferred to the data line 14b and the gate node g via the capacitance element 75.

Here, assuming that the capacitance of the capacitance element 75 is Crf1 and a capacitance parasitic to the data line 14b is Cdt, the voltage of the gate node g in the pixel circuit 110 shifts from the voltage (Vel−Vth) by an amount obtained by multiplying the voltage shift amount at the one end of the capacitance element 75 by a ratio of the capacitance Crf1 with respect to a sum of the capacitances Crf1 and Cdt, and the voltage of the gate node g after the shift is held by the capacitance element 132.

Note that the above-described ratio should also take into account the capacitance of the capacitance element 132, but the capacitance of the capacitance element 132 can be ignored if it is sufficiently small in comparison to the capacitances Crf1 and Cdt.

After the writing period (C) ends, the light emission period (D) is reached. In other words, after the end of the selection of the scanning line 12 in the i-th row, when the light emission period (D) is reached, the control signal /Gel(i) is inverted to the L level, and thus, the transistor 124 is ON. As a result, a current corresponding to a voltage Vgs held by the capacitance element 132 flows through the OLED 130, and the OLED 130 emits light at a luminance corresponding to the current.

Note that while FIG. 5 illustrates an example in which the light emission period (D) is continuous after the selection of the scanning line 12 in the i-th row, the period in which the control signal /Gel(i) is at the L level may be intermittent or may be adjusted in accordance with a luminance adjustment. Further, the level of the control signal /Gel(i) in the light emission period (D) may be increased to be higher than the L level in the compensation period (B). In other words, a level between the H level and the L level may be used for the level of the control signal /Gel(i) in the light emission period (D).

In the pixel circuit 110 on which attention is being focused, the voltage Vgs between the gate and the source in the writing period (C) and the light emission period (D) is, as described above, the voltage that has been changed in accordance with the gray scale level of the pixel circuit 110 from the threshold voltage Vth in the compensation period (B). Since similar operations are also performed in the other pixel circuits 110, in the first embodiment, the current that accords with the gray scale level flows through the OLED 130 in a state in which the threshold voltage of the transistors 121 in all the pixel circuits 110 in the m rows and (3q) columns has been compensated for. Therefore, in the first embodiment, variations in luminance are small, and as a result, high quality display is possible.

Note that in FIG. 6 to FIG. 9, the regions in which the switch group 40 and the initialization circuit 50 are provided are not particularly distinguished.

The electrical configuration of the display device 10 is as described above. Next, the importance of uniformity of the voltages Vini and Vref when viewed in the columns in the display device 10 will be described.

In the display device 10, in the initialization period (A), the data line 14b, the one end of the capacitance element 132, the gate node g of the transistor 121, and the other end of the capacitance element 75 are initialized by the voltage Vini. Until an end phase of the compensation period (B) is reached, the data line 14b, the one end of the capacitance element 132, the gate node g of the transistor 121, and the other end of the capacitance element 75 converge from the voltage Vini of the initialization period (A) to the voltage (Vel−Vth).

It is necessary for the voltage Vini to be a voltage that is sufficient to turn on the transistor 121 in a starting phase of the compensation period (B).

Here, when the voltage Vini is different between the columns, a voltage state before convergence to the voltage (Vel−Vth) at the gate node g in each of the columns differs between the columns in the starting phase of the compensation period (B). When the voltage Vini is different between the columns, at the end phase of the compensation period (B), in a given one of the columns, the gate node g converges to the voltage (Vel−Vth), but in another of the columns, a state may occur in which the voltage does not converge to the voltage (Vel−Vth). In this state, the threshold value of the transistor 121 in each of the columns cannot be compensated for, which leads to a deterioration in display quality.

Thus, it is necessary for the voltage Vini to be uniform between the columns.

Further, in the display device 10, the voltage Vref is applied to the one end of the capacitance element 75 in the compensation period (B). The one end of the capacitance element 75 shifts from the voltage Vref of the compensation period (B) to the voltage held in the capacitance element 41.

On the other hand, in the writing period (C), the data line 14b, the one end of the capacitance element 132, and the gate node g shift from the voltage (Vel−Vth) of the compensation period (B) by an amount obtained by multiplying the voltage shift amount at the one end of the capacitance element 75 by the ratio of the capacitance.

Here, when the voltage Vref is different between the columns, the amount of the voltage shift at the one end of the capacitance element 75 varies between the columns. When the voltage Vref differs between the columns, even if the voltage of the first data signal held at the one end of the capacitance element 41 in each of the columns is the same, the voltage held at the one end of the capacitance element 132 via the data line 14b differs between the columns, leading to the deterioration in the display quality.

Thus, it is also necessary for the voltage Vref to be uniform between the columns.

Further, in the display device 10, attention should be paid to wiring from a specific terminal among the plurality of terminals 180 to each of the elements, and in particular to power supply wiring.

Figure 10:
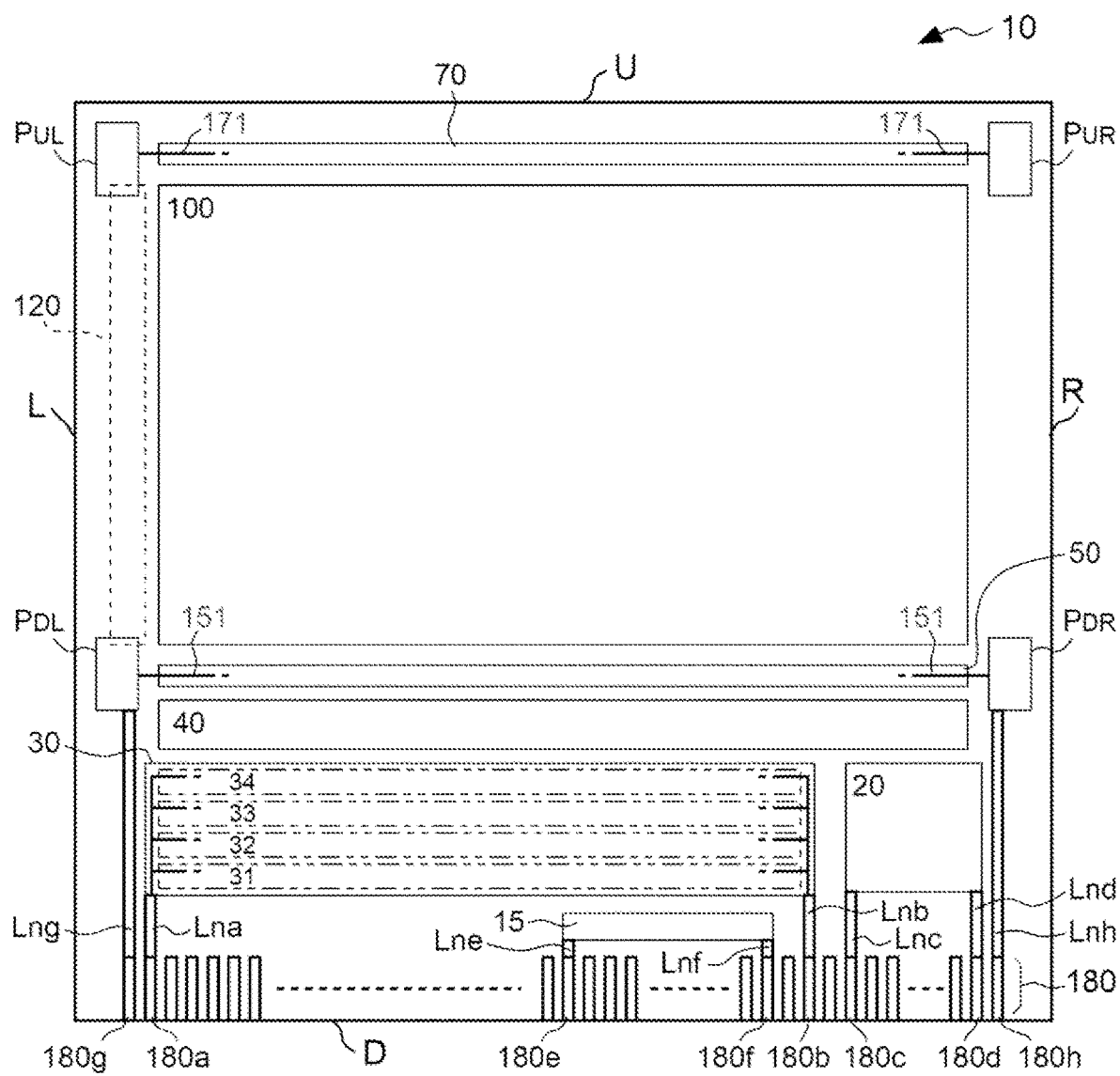
FIG. 10 is a plan view illustrating an arrangement of elements and wiring in the display device.

FIG. 10 is a plan view illustrating positions of each of the elements and the power supply wiring in the display device 10 according to the first embodiment.

Note that, since the display device 10 is obtained by dicing a wafer-shaped semiconductor substrate, the display device 10 has a rectangular shape. For this reason, of the rectangular-shaped display device 10, as illustrated in FIG. 10, for convenience, the upper side is denoted by a reference sign U, the lower side is denoted by a reference sign D, the left side is denoted by a reference sign L, and the right side is denoted by a reference sign R.

The auxiliary circuit 70 is provided between the upper side U and the display region 100. Further, the scanning line drive circuit 120 is provided between the left side L and the display region 100, as indicated by dashed lines. The plurality of terminals 180, the interface 15, the data signal output circuit 30, the switch group 40, and the initialization circuit 50 are provided between the lower side D and the display region 100, in that order from the lower side D.

Note that the plurality of terminals 180 are provided along the lower side D, more specifically, in the lateral direction in FIG. 10.

Since the capacitance elements 41 and the transmission gates 45 in the switch group 40 are provided corresponding to the data transfer lines 14a, in FIG. 10, the length of the switch group 40 in the lateral direction is substantially the same as the length of the display region 100. Similarly, since the transistors 56 in the initialization circuit 50 are provided corresponding to the data lines 14b, in FIG. 10, the length of the initialization circuit 50 in the lateral direction is substantially the same as the length of the display region 100.

On the other hand, the data signal output circuit 30 is arranged to be closer to the left side in FIG. 10, since the data signal output circuit 30 does not have correspondence with the data transfer lines 14a. When the data signal output circuit 30 is arranged to be closer to the left side, an empty space is generated on the right of the data signal output circuit 30. In the first embodiment, the control circuit 20 is provided in this empty space. Note that the interface 15 is provided between the plurality of terminals 180 and the data signal output circuit 30, and in the vicinity of the control circuit 20.

In FIG. 2 and FIG. 3, for convenience of explanation, the total number of the data lines 14b is "3q",
the number of groups is q, and the number of phases in the parallel conversion is "3". Here, in order to give a more specific description, for example, a case will be described in which the total number of the data lines 14b is "5760" (=1920×3), the number of groups is "24", and the number of phases of the parallel conversion is "240".

The data signal output circuit 30 includes the shift register 31, the latching circuit 32, the D/A converter circuit group 33, and the amplifier group 34. Of these, the D/A converters in the D/A converter circuit group 33 and the amplifiers in the amplifier group 34 are provided corresponding to the parallel converted phase, so the number of D/A converters and the number of the amplifiers is also "240". The D/A converters and the amplifiers in the data signal output circuit 30 are respectively disposed along the lateral direction, and, in alignment with this arrangement, unit circuits of the shift register 31 and unit circuits of the latching circuit 32 are also provided along the lateral direction.

In other words, when the number of phases of the parallel conversion is "240," a number of sets of the unit circuits of the shift register 31, the unit circuits of the latching circuit 32, the amplifiers, and the D/A converters is also "240", and the "240" sets of these circuits are arranged side-by-side along the lateral direction.

Note that the unit circuit of the shift register 31 refers to a circuit that is coupled in tandem in order to sequentially transfer the image signal Vdat, and the unit circuit of the latching circuit 32 refers to a circuit for storing one pixel of the image signal Vdat transferred by the shift register 31.

When a configuration is adopted in which the power to the data signal output circuit 30 extending in the lateral direction in FIG. 10 is supplied to one of the left or the right, a voltage drop occurs in the other side on the left or the right. Thus, in the first embodiment, a configuration is adopted in which the power to the data signal output circuit 30 is supplied to both the left and right ends. Specifically, a configuration is adopted in which the power to the data signal output circuit 30 is supplied via a wiring line Lna extending linearly from a specific terminal 180a and a wiring line Lnb extending linearly from another terminal 180b.

More specifically, the wiring line Lna branches into four lines, such as into four branched lines in the rightward direction, as illustrated by solid lines in FIG. 10, and the four branched wiring lines extend in the rightward direction along each of regions of the shift register 31, the latch circuit 32, the D/A converter circuit group 33, and the amplifier group 34. Similarly, the wiring line Lnb branches into four lines in the leftward direction, and the four branched wiring lines extend in the leftward direction along each of the regions of the shift register 31, the latch circuit 32, the D/A converter circuit group 33, and the amplifier group 34, and are respectively coupled to the wiring lines branching from the wiring line Lna.

An array direction of the plurality of terminals 180 and the left to right direction of the data signal output circuit 30 are aligned. Specifically, the plurality of terminals 180 are arrayed along the lower side D, and the left to right direction, which is the longitudinal direction of the data signal output circuit 30, is also aligned with the lower side D. Thus, the length of the wiring line Lna extending linearly from the terminal 180a to the left end of the data signal output circuit 30 and the length of the wiring line Lnb from the terminal 180b to the right end of the data signal output circuit 30 are substantially the same.

Therefore, as long as the line width is the same, the resistance of the wiring line Lna and the resistance of the wiring line Lnb are substantially the same. Note that, of a distance from the terminal 180 to the data signal output circuit 30, the length of the wiring line refers to a distance of a section that excludes a coupling portion with the FPC substrate 194, and the line width refers to a distance in the direction orthogonal to the extending direction.

The power to the control circuit 20 is also configured to be supplied from both the right and left ends. Specifically, a configuration is adopted in which the power to the control circuit 20 is supplied via a wiring line Lnc extending linearly from a terminal 180c and a wiring line Lnd extending linearly from another terminal 180d.

Since the length of the wiring line Lnc and the length of the wiring line Lnd are substantially the same, as long as the line width is the same, the resistance of the wiring line Lna and the resistance of the wiring line Lnd are substantially the same.

Similarly, the power to the interface 15 is also configured to be supplied from both the right and left ends. Specifically, a configuration is adopted in which the power to the interface 15 is supplied via a wiring line Lne extending linearly from a terminal 180e and a wiring line Lnf extending linearly from another terminal 180f.

Since the length of the wiring line Lne and the length of the wiring line Lnf are substantially the same, as long as the line width is the same, the resistance of the wiring line Lne and the resistance of the wiring line Lnf are substantially the same In the first embodiment, a built-in power supply is provided in each of the four corners of the display region 100. Specifically, in FIG. 10, a built-in power supply PUL is provided at the upper left end of the display region 100, a built-in power supply PUR is provided at the upper right end, a built-in power supply PDL is provided at the lower right end, and a built-in power supply PDR is provided at the lower right end. Of these, the built-in power supply PUL supplies the voltage Vref to the left end of the auxiliary circuit 70 via the power supply line 171, and the built-in power supply PUR supplies the voltage Vref to the right end of the auxiliary circuit 70 via the supply line 171. Thus, the voltage Vref is supplied to the auxiliary circuit 70 from both the left and right ends.

The built-in power supply PDL supplies the voltage Vini to the left end of the initialization circuit 50 via the power supply line 151, and the built-in power source PDR supplies the voltage Vini to the right end of the initialization circuit 50 via the power supply line 151. Thus, the voltage Vini is supplied to the initialization circuit 50 from both the left and right ends.

The built-in power supply PDL generates the voltage Vini, as a power supply, using a voltage supplied via a wiring line Lng that extends linearly from a terminal 180g, of the plurality of terminals 180. The built-in power source PDR generates the voltage Vini, as the power supply, using a voltage supplied via a wiring line Lnh that extends linearly from a terminal 180h, of the plurality of terminals 180.

The role of the built-in power supplies PDL and PDR is to supply the voltage Vini from both the right and left ends, in order to suppress a voltage drop on the other side, in comparison to a configuration in which the voltage Vini is supplied from one of the left or right ends. In other words, in the present embodiment, the voltage Vini is equalized as a result of the voltage Vini being supplied from both the right and left ends, thus suppressing a deterioration in the display quality.

Note that a configuration may be adopted in which the voltage Vini is supplied primarily from one of the built-in power supplies PDL or PDR, and secondarily from the other of the built-in power supplies PDL or PDR, and the other secondary power supply may supply a voltage to compensate for a shortage caused by the voltage drop. Further, a voltage setting by the built-in power supply PDL may be different from that of the built-in power supply PDR. Note that the control circuit 20, for example, determines which of the built-in power supply PDL or PDR is primarily used and which is secondary, and the control of the secondary power supply is set, for example, by rewriting a stored value of the register in the control circuit 20, for example. Further, a capacitance element for stabilizing (smoothing) is provided in the primary built-in power supply.

The wiring to the built-in power supplies PUL and PUR is not particularly illustrated, but the voltage supplied via the terminals 180 is generated as a power supply to generate the voltage Vref. Note that the built-in power supplies PUL and PUR may generate the voltage Vref, as the power supply, using a voltage supplied via the wiring lines that are an extension of the wiring lines Lng and Lnh.

The role of the built-in power supplies PUL and PUR is to supply the voltage Vref from both the right and left ends, in order to suppress a voltage drop on the other side, in comparison to a configuration in which the voltage Vref is supplied from one of the left or right ends. In other words, in the present embodiment, the voltage Vref is equalized as a result of the voltage Vref being supplied from both the right and left ends, thus suppressing a deterioration in the display quality.

Note that a configuration may be adopted in which the voltage Vref is supplied primarily from one of the built-in power supplies PUL or PUR, and secondarily from the other of the built-in power supplies PUL or PUR, and the other secondary power supply may supply a voltage to compensate for a shortage caused by a voltage drop. Note that the control circuit 20, for example, determines which of the built-in power supply PUL or PUR is primarily used and which is secondary, and the control of the secondary power supply is set, for example, by rewriting a stored value of the register in the control circuit 20, for example.

Figure 14:
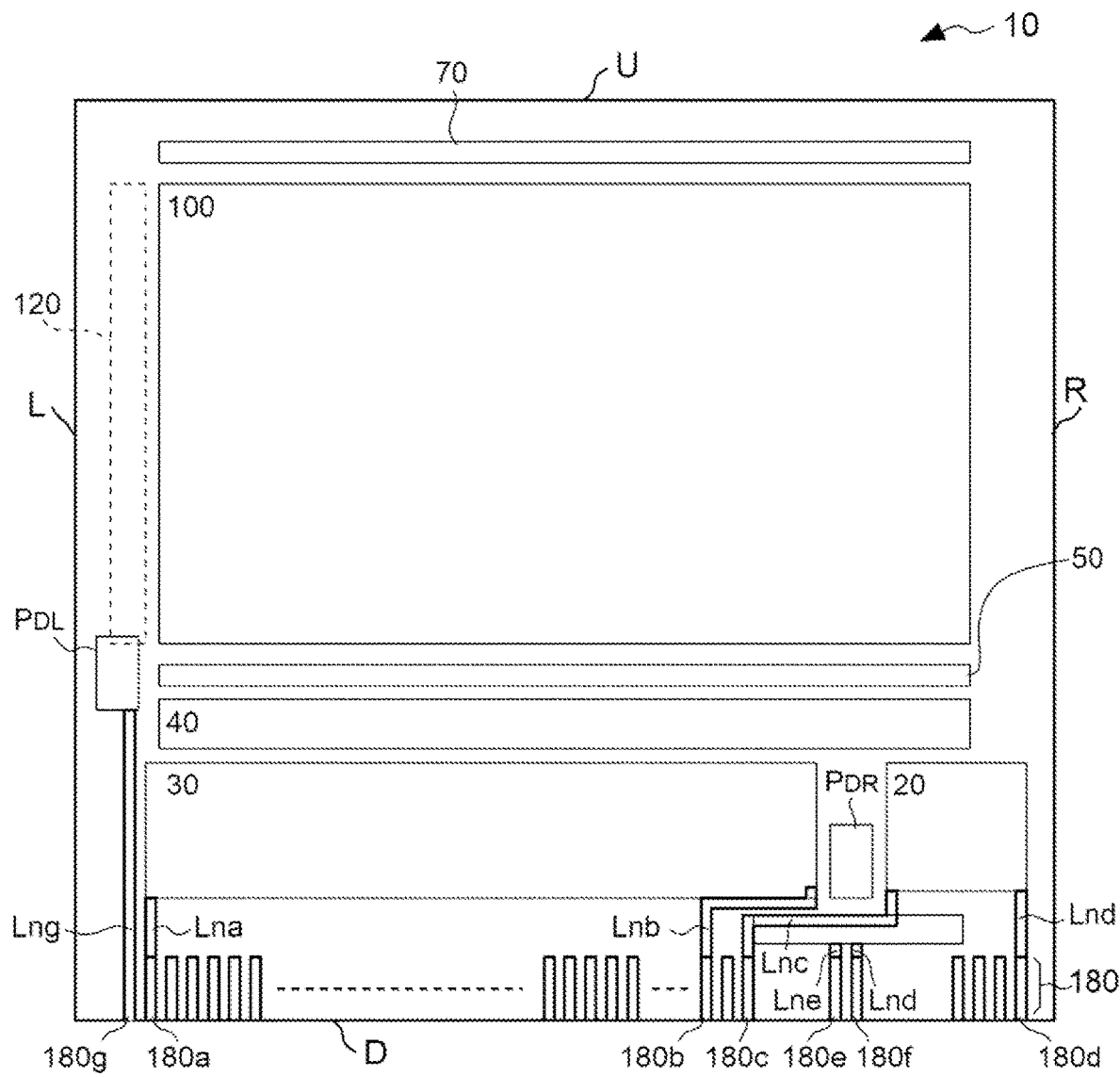
FIG. 14 is a plan view illustrating the display device according to a first comparative example.

FIG. 14 is a diagram illustrating a first comparative example for describing an effect of the power supply wiring lines in the first embodiment.

In the first comparative example, since the interface 15 is positioned near the control circuit 20, the length of the wiring line Lnb to the right end of the data signal output circuit 30 from the terminal 180b is longer than the wiring line Lna in order to avoid the interface 15, and the resistance thereof also increases. Similarly, the length of the wiring line Lnc to the left end of the control circuit 20 from the terminal 180c is longer than the wiring line Lnd in order to avoid the interface 15, and the resistance thereof also increases.

In the data signal output circuit 30, when the resistance of the wiring line Lnb is greater than the resistance of the wiring line Lna, the power supply voltage becomes non-uniform when viewed along the lateral direction in FIG. 14. In the data signal output circuit 30, when the power supply voltage becomes non-uniform, in the analog system, a difference occurs in the output of the D/A converter and the output of the amplifier, in the digital system, a transfer error occurs in the shift register 31, and a latch operation malfunction occurs in the latching circuit 32.

In the control circuit 20, when the power supply voltage is non-uniform when comparing the left end and the right end, a lookup table (RAM), a register, or the like are affected, thus generating a malfunction.

Furthermore, the interface 15 has a higher power consumption compared to the control circuit 20 and the data signal output circuit 30, and this may cause an operational malfunction when the interface 15 is provided in a position that interferes with other circuits or power supply wiring lines to those circuits.

In contrast, in the first embodiment illustrated in FIG. 10, in the data signal output circuit 30, the length of the wiring line Lna and the length of the wiring line Lnb are substantially the same, and the resistance of the wiring line Lna and the resistance of the wiring line Lnb are also substantially the same. As a result, the power supply voltage is equalized to the left and right. Therefore, in the analog system, the difference between the output of the D/A converter and the output of the amplifier is reduced, and display unevenness is thus suppressed. Further, in the digital system, transfer errors and latch operation malfunctions are suppressed.

Further, in the control circuit 20, the length of the wiring line Lnc and the length of the wiring line Lnd are substantially the same, and the resistance of the wiring line Lnc and the resistance of the wiring line Lnd are also substantially the same. As a result, the power supply voltage is equalized to the left and right. Thus, malfunctions in the control circuit 20 are suppressed.

Furthermore, the interface 15 is provided between the data signal output circuit 30 and the plurality of terminals 180, and is provided at a position that does not interfere with the wiring lines Lnb and Lnc, which are the power supply wiring lines of other circuits, and thus the occurrence of operational malfunctions is suppressed.

Here, when assuming a configuration in which a difference between the H level and the L level of the logic signal in the display device 10 in the first embodiment is 1.8 V, and approximately 200 mA flows through the interface 15, the control circuit 20, or the data signal output circuit 30 at a peak time, as long as the difference in the power supply voltage is not greater than 0.4 V, malfunctions of the logic circuit can be suppressed. Expressed in reverse, if the resistance of each of the wiring lines Lna, Lnb, Lnc, Lnd, Lne, and Lnf is not greater than 2Ω, the difference in the power supply voltage can be set to be not greater than 0.4 V.

Next, the display device 10 according to a second embodiment will be described.

Figure 11:
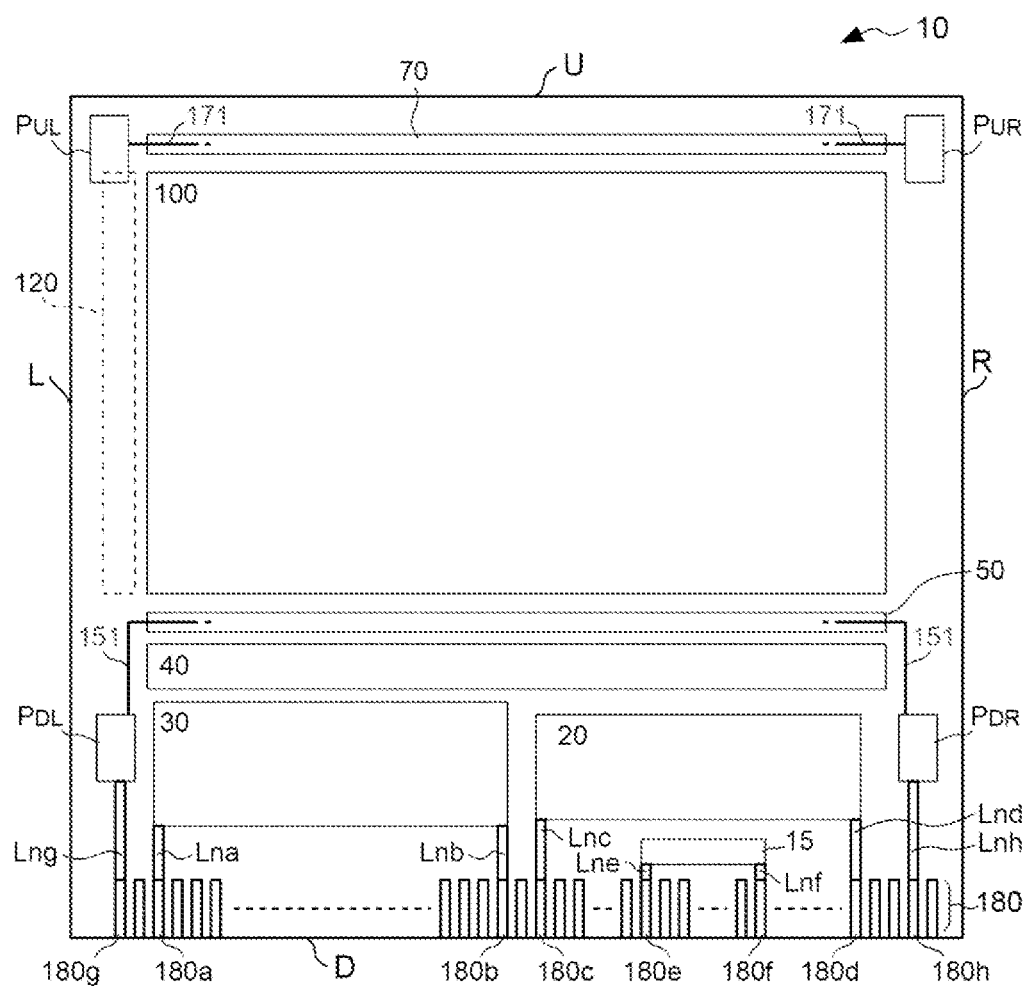
FIG. 11 is a plan view illustrating an arrangement of the elements and wiring of the display device according to a second embodiment.

FIG. 11 is a plan view illustrating the position of each of the elements and the power supply wiring lines in the display device 10 according to the second embodiment.

Although the description of FIG. 10 assumes a case in which the total number of the data lines 14b is "5760" and the number of phases of the parallel conversion is "240", in the second embodiment, a case is assumed in which the total number of the data lines 14b is reduced to ⅓, namely, to "1920", while maintaining the size of the display area 100 and keeping the number of groups at "24". In this case, since the number of phases of the parallel conversion is "80", in FIG. 11, the lateral size of the data signal output circuit 30 is shortened compared to FIG. 10.

In addition, since the total number of the data lines 14b is reduced to ⅓ of the first embodiment, the amount of data per unit time supplied from the host device is also reduced to ⅓ of the first embodiment. Thus, the interface 15 is also downsized in comparison to FIG. 10. Thus, the interface 15 can be positioned between the control circuit 20 and the plurality of terminals 180 so as to fit within the lateral size of the control circuit 20.

Figure 15:
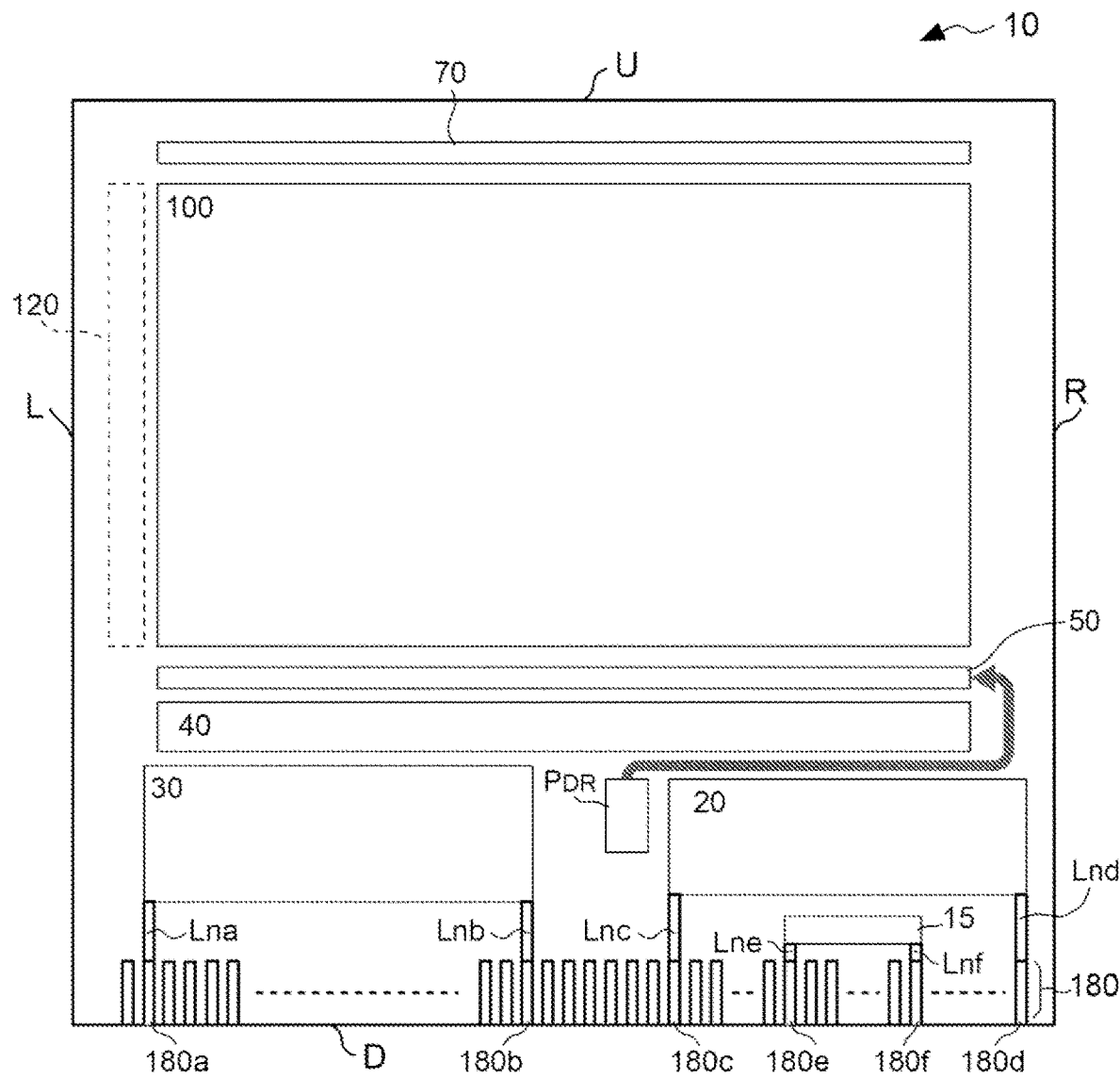
FIG. 15 is a plan view illustrating the display device according to a second comparative example.

FIG. 15 is a diagram illustrating a second comparative example for describing the effect of the power supply wiring lines in the second embodiment.

Since the size in the lateral direction of the data signal output circuit 30 is shortened, there is an empty space between the control circuit 20 and the data signal output circuit 30. The second comparative example is an example in which the built-in power supply PDR is disposed in this opening.

However, in this example, the voltage output from the built-in power supply PDR is supplied to the initialization circuit 50 via wiring along the left side and the top side of the control circuit 20, as indicated by a bold line arrow in FIG. 15, and the initialization circuit is more likely to be affected by the wiring lines. Further, in this example, there is no margin to the left of the data signal output circuit 30, and the built-in power supplies PDL and PUL cannot be provided, the voltage Vini is only supplied to the right end of the initialization circuit 50, and the left end will be affected by the voltage drop. Further, in the auxiliary circuit 70, the voltage Vref is only supplied from the built-in power supply PDR to the right end, as indicated by a bold dashed line, and the left end is affected by the voltage drop.

In contrast, in the second embodiment illustrated in FIG. 11, a configuration is adopted in which the control circuit 20 and the data signal output circuit 30 are brought closer to the center to create empty spaces to the left of the data signal output circuit 30 and to the right of the control circuit 20, the built-in power supply PDL is provided in the empty space to the left of the data signal output circuit 30, and the built-in power supply PDR is provided in the empty space to the right of the control circuit 20. According to this configuration, the voltage Vini is supplied to both the left and right ends of the power supply line 151.

Further, a configuration is adopted in which the built-in power supply PUL is provided on an extending line of the built-in power supply PDL as seen from the terminal 180g, that is, at the upper left end of the display region 100, and the built-in power supply PUR is provided on an extending line of the built-in power supply PDR as seen from the terminal 180h, that is, at the upper right end of the display region 100. According to this configuration, the voltage Vref is supplied to both the left and right ends of the power supply line 171.

According to the display device 10 according to the second embodiment, the voltage Vini is supplied to the initialization circuit 50 from both the right and left ends by the built-in power supplies PDL and PDR. Thus, a deterioration in the display quality due to the voltage drop is suppressed. Further, since the voltage Vref is supplied to the initialization circuit 50 from both the right and left ends of the power supply line 151 by the built-in power supplies PUL and PUR, the deterioration in the display quality due to the voltage drop is suppressed.

Modified Examples, Application Examples, and the Like

In the embodiments described above, the following applications and modifications are possible.

In the example illustrated in FIG. 2 and FIG. 3, a configuration is described in which the three data lines 14b corresponding to the number of phases are sequentially selected by group, and the first data signals Vd(1) to Vd(3) output from the data signal output circuit 30 are sampled by the transmission gate 45 of the selected column and held in the capacitance element 41.

Since a path length from the data signal output circuit 30 to the input end of the transmission gate 45 varies from group to group, even if the same voltage is output from the data signal output circuit 30, the voltage held in the capacitance element 41 may be different and may thus affect the display.

Here, a configuration may be adopted in which the control circuit 20 outputs a correction value for each of the selected groups, that is, outputs a correction value in accordance with the number "j" of the control signal Sel that is at the H level, among the control signals Sel(1) to Sel(q), and the data signal output circuit 30 corrects the first data signals Vd(1) to Vd(3) in accordance with the correction value.

The power supply wiring lines actually include high level wiring lines and low level wiring lines. Of these, the low level wiring lines may be a common wiring line using a grounding potential, for example.

In the embodiments, an example is illustrated in which serial/parallel conversion is used to convert the data signal into the three phases, the 80 phases or the 240 phases, but it is sufficient that the number of phases be two or more.

The display device 10 has a configuration in which the threshold value of the transistor 121 in the pixel circuit 110 is compensated, but the display device 10 may have a configuration that does not perform compensation, and specifically, a configuration may be used in which the transistor 123 is omitted.

Further, in the embodiments, the OLED 130 is illustrated as an example of the display element, but other display elements may be used. For example, a liquid crystal element may be used as the display element. The liquid crystal elements may also be formed in a semiconductor substrate, such as a silicon substrate. In this case also, a configuration is adopted in which the serial/parallel converted data signal is applied to the liquid crystal element via the capacitance element.

The channels of the transistors 56, 73, and 121 to 125 are not limited to the embodiments. Further, these transistors 56, 73, and 121 to 125 may be replaced with transmission gates as appropriate. Conversely, the transmission gates 45 and 72 may be replaced by a single channel transistor.

Electronic Apparatus

Next, an electronic apparatus to which the display device 10 according to the above-described embodiments is applied will be described. The display device 10 is suitable for an application for a high definition display using a small pixel size. Here, a head-mounted display will be described as an example of the electronic apparatus.

Figure 12:
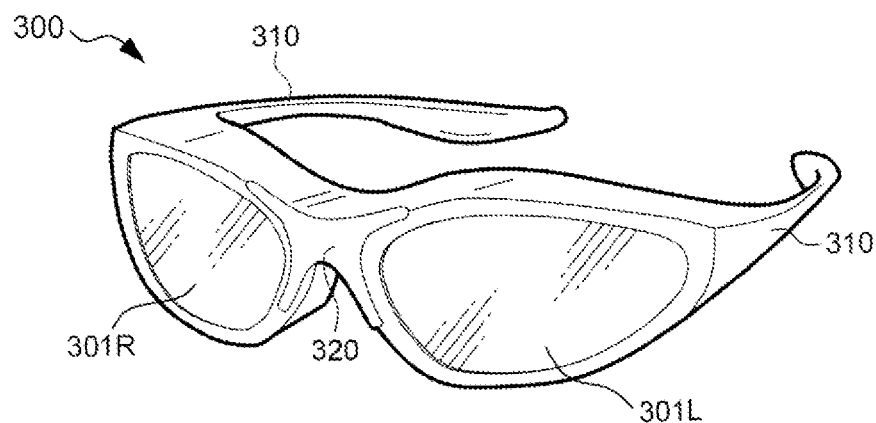
FIG. 12 is a perspective view illustrating a head-mounted display using the display device.
Figure 13:
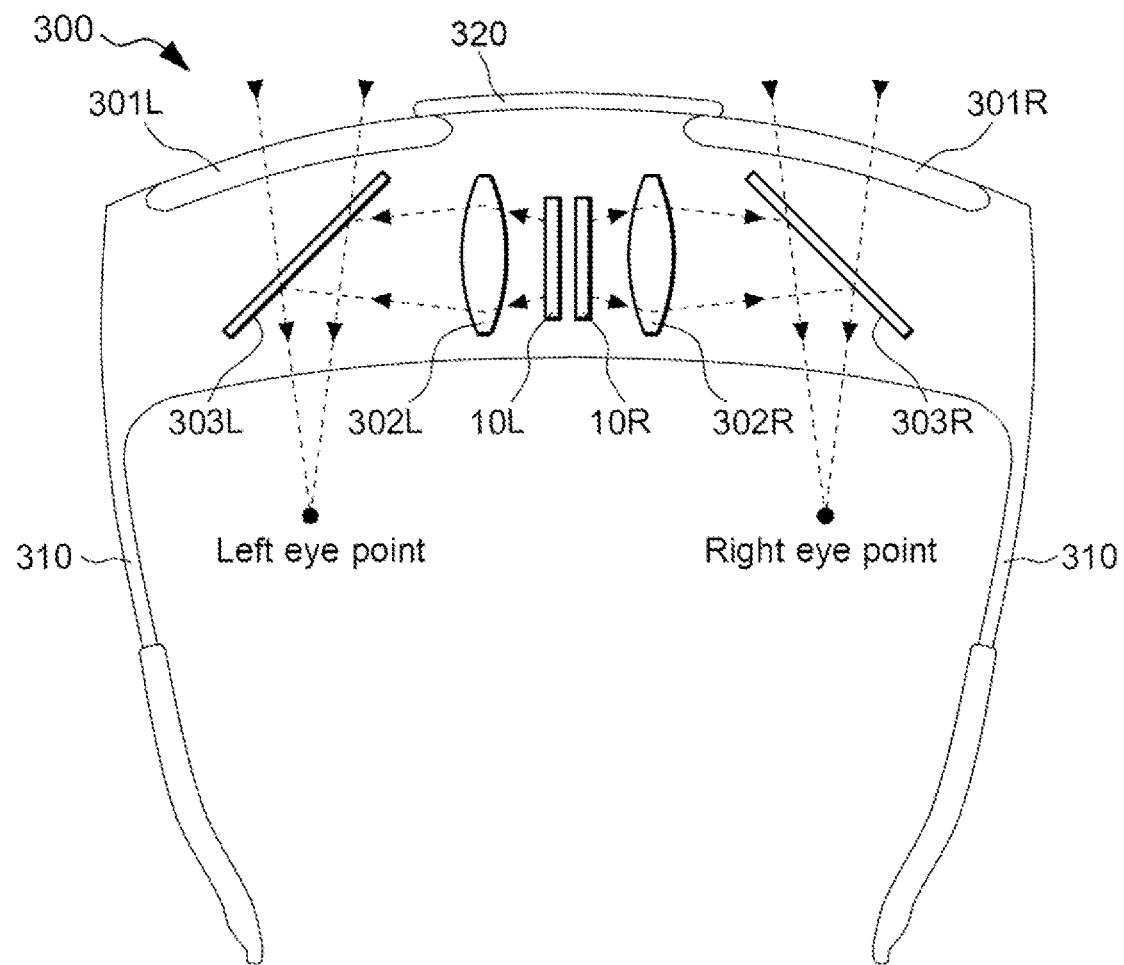
FIG. 13 is a diagram illustrating an optical configuration of the head-mounted display.

FIG. 12 is a diagram illustrating an external appearance of a head-mounted display, and FIG. 13 is a diagram illustrating an optical configuration of the head-mounted display.

First, as illustrated in FIG. 12, a head-mounted display 300 includes, in terms of appearance, temples 310, a bridge 320, and lenses 301L and 301R, similarly to typical eye glasses. Further, as illustrated in FIG. 13, the head-mounted display 300 is provided with a display device 10L for a left eye and a display device 10R for a right eye, in the vicinity of the bridge 320 and on the rear side (the lower side in the figure) of the lenses 301L and 301R.

An image display surface of the display device 10L is disposed to be on the left side in FIG. 13. According to this configuration, a display image by the display device 10L is output via an optical lens 302L in a 9 o'clock direction in FIG. 13. A half mirror 303L reflects the display image by the display device 10L in a 6 o'clock direction, while transmitting light that is incident from a 12 o'clock direction. An image display surface of the display device 10R is disposed on the right side opposite to the display device 10L. According to this configuration, a display image by the display device 10R is output via an optical lens 302R in a 3 o'clock direction in FIG. 13. A half mirror 303R reflects the display image by the display device 10R in the 6 o'clock direction, while transmitting the light incident from the 12 o'clock direction.

In this configuration, a wearer of the head-mounted display 300 can observe the display images by the display devices 10L and 10R in a see-through manner in which the display images by the display devices 10L and 10R overlap with an outside scene.

Further, in the head-mounted display 300, of the images for both eyes that generate parallax, by displaying the image for the left eye on the display device 10L, and displaying the image for the right eye on the display device 10R, it is possible to cause the wearer to perceive the displayed images as an image having depth and a three dimensional effect.

Note that, with respect to the electronic apparatus including the display device 10, in addition to the head mounted display 300, the display device 10 can be applied to an electronic viewing finder in a video camera, a lens-exchangeable digital camera, or the like.

Supplementary Notes

A display device according to an aspect (a first aspect) of the present disclosure includes a substrate, a first pixel circuit and a second pixel circuit provided on the substrate, first to fourth switches provided on the substrate, first to fourth capacitance elements provided on the substrate, and a first power supply and a second power supply provided on the substrate. The first pixel circuit is provided corresponding to a first data line, the second pixel circuit is provided corresponding to a second data line, a first data transfer line is provided corresponding to the first data line, and a second data transfer line is provided corresponding to the second data line. The first capacitance element holds a voltage of a data signal transferred to the first data transfer line and the third capacitance element holds a voltage of a data signal transferred to the second data transfer line. The first switch is provided between the first data transfer line and one end of the second capacitance element, the first data line being coupled to another end of the second capacitance element. The third switch is provided between the second data transfer line and one end of the fourth capacitance element, the second data line being coupled to another end of the fourth capacitance element. The second switch is provided between a power supply line of a reference voltage and the one end of the second capacitance element. The fourth switch is provided between the power supply line and the one end of the fourth capacitance element. In a first period, the first switch and the third switch are OFF and the second switch and the fourth switch are ON. In a second period subsequent to the first period, the first switch and the third switch are ON and the second switch and the fourth switch are OFF. The first power supply supplies the reference voltage to one end of the power supply line, and the second power supply supplies the reference voltage to another end of the power supply line.

According to this aspect, the reference voltage is supplied to both ends of the power supply line from the first power supply and the second power supply, and thus, compared to a configuration in which the reference voltage is supplied to the power supply line from one side only, a voltage drop on the other side is suppressed. As a result, a reduction in display quality caused by unevenness of the reference voltage is suppressed.

Note that the built-in power supply PUL is an example of the first power supply, the built-in power supply PUR is an example of the second power supply, the voltage Vref is an example of the reference voltage, and the power supply line 171 is an example of the power supply line.

Further, the capacitance element 41 in which the first data signal Vd(1) is as a result of the transmission gate being turned on is an example of the first capacitance element, and the data transfer line 14a to which the first data signal Vd(1) is transferred is an example of the first data transfer line. Further, the transmission gate 72, the transistor 73, the capacitance element 75, the data line 14b, and the pixel circuit 110 provided in a transfer path of the first data signal Vd(1) are examples, respectively, of the first switch, the second switch, the second capacitance element, the first data line, and the first pixel circuit.

The capacitance element 41 in which the first data signal Vd(2) is held as a result of the transmission gate being turned on is an example of the third capacitance element, and the data transfer line 14a to which the first data signal Vd(2) is transferred is an example of the second data transfer line. Further, the transmission gate 72, the transistor 73, the capacitance element 75, the data line 14b, and the pixel circuit 110 provided in a transfer path of the first data signal Vd(2) are examples, respectively, of the third switch, the fourth switch, the fourth capacitance element, the second data line, and the second pixel circuit.

The initialization period (A) or the compensation period (B) is an example of the first period, and the writing period (D) is one example of the second period.

A display device according to another aspect (a second aspect) of the present disclosure includes a substrate, a first pixel circuit and a second pixel circuit provided on the substrate, first to fourth switches provided on the substrate, first to fourth capacitance elements provided on the substrate, and a first power supply and a second power supply provided on the substrate. The first pixel circuit is provided corresponding to a first data line, the second pixel circuit is provided corresponding to a second data line, a first data transfer line is provided corresponding to the first data line, and a second data transfer line is provided corresponding to the second data line. The first capacitance element holds a voltage of a data signal transferred to the first data transfer line and the third capacitance element holds a voltage of a data signal transferred to the second data transfer line. The first switch is provided between the first data transfer line and one end of the second capacitance element, the first data line being coupled to another end of the second capacitance element. The third switch is provided between the second data transfer line and one end of the fourth capacitance element, the second data line being coupled to another end of the fourth capacitance element. The second switch is provided between a power supply line of an initialization voltage and the first data line. The fourth switch is provided between the power supply line and the second data line. In a first period, the first switch and the third switch are OFF and the second switch and the fourth switch are ON. In a second period subsequent to the first period, the first switch and the third switch are ON and the second switch and the fourth switch are OFF. The first power supply supplies the initialization voltage to one end of the power supply line, and the second power supply supplies the initialization voltage to another end of the power supply line.

According to this aspect, the initialization voltage is supplied to both ends of the power supply line from the first power supply and the second power supply, and thus, compared to a configuration in which the initialization voltage is supplied to the power supply line from one side only, a voltage drop on the other side is suppressed. As a result, a reduction in display quality caused by unevenness of the initialization voltage is suppressed.

Note that the built-in power source PDL is an example of the first power supply, the built-in power source PDR is an example of the second power supply, the voltage Vini is an example of the initialization voltage, and the power supply line 151 is an example of the power supply line.

Further, the capacitance element 41 in which the first data signal Vd(1) is held as a result of the transmission gate being turned on is an example of the first capacitance element, and the data transfer line 14a to which the first data signal Vd(1)

is transferred is an example of the first data transfer line. Further, the transmission gate 72, the capacitance element 75, the data line 14b, the pixel circuit 110, and the transistor 56 provided in the transfer path of the first data signal Vd(1) are examples, respectively, of the first switch, the second capacitance element, the first data line, the first pixel circuit, and the second switch.

Further, the capacitance element 41 in which the first data signal Vd(2) is held as a result of the transmission gate being turned on is an example of the third capacitance element, and the data transfer line 14a to which the first data signal Vd(2) is transferred is an example of the second data transfer line. Further, the transmission gate 72, the capacitance element 75, the data line 14b, the pixel circuit 110, and the transistor 56 provided in the transfer path of the first data signal Vd(2) are examples, respectively, of the third switch, the fourth capacitance element, the second data line, the second pixel circuit, and the fourth switch.

The initialization period (A) is an example of the first period, and the writing period (D) is an example of the second period.

In a display device according to a specific aspect (a third aspect) of the first aspect or the second aspect, the first pixel circuit and the second pixel circuit are disposed between the second capacitance element and the fourth capacitance element, and a data signal output circuit that outputs the data signal.

According to this aspect, the second capacitance element and the fourth capacitance element, and the data signal output circuit are provided with the display region interposed therebetween. Therefore, when the display region is used as a reference, elements need not necessarily be concentrated in a region in which the data signal output circuit is provided.

The electronic device according to a specific aspect (fourth aspect) of the first to third aspects includes According to this aspect, a reduction in display quality in the miniaturized display device is suppressed.

What is claimed is:

1. A display device comprising:
a first data line;
a second data line;
a first data transfer line corresponding to the first data line;
a second data transfer line corresponding to the second data line;
a first capacitance element holding a voltage of a data signal transferred to the first data transfer line;
a second capacitance element electrically coupled to the first data line;
a third capacitance element holding a voltage of a data signal transferred to the second data transfer line;
a fourth capacitance element electrically coupled to the second data line;
a power supply line to which a reference voltage is supplied;
a first switch provided between the first data transfer line and the second capacitance element;
a second switch provided between the power supply line and the second capacitance element;
a third switch provided between the second data transfer line and the fourth capacitance element;
a fourth switch provided between the power supply line and the fourth capacitance element;
a first power supply supplying the reference voltage to one end of the power supply line; and
a second power supply supplying the reference voltage to another end of the power supply line, wherein
in a first period, the first switch and the third switch are OFF and the second switch and the fourth switch are ON, and
in a second period subsequent to the first period, the first switch and the third switch are ON and the second switch and the fourth switch are OFF.

2. A display device comprising:
a first data line;
a second data line;
a first data transfer line corresponding to the first data line;
a second data transfer line corresponding to the second data line;
a first capacitance element holding a voltage of a data signal transferred to the first data transfer line;
a second capacitance element electrically coupled to the first data line;
a third capacitance element holding a voltage of a data signal transferred to the second data transfer line;
a fourth capacitance element electrically coupled to the second data line;
a power supply line to which a initialization voltage is supplied;
a first switch provided between the first data transfer line and the second capacitance element;
a second switch provided between the power supply line and the first data line;
a third switch provided between the second data transfer line and the fourth capacitance element;
a fourth switch provided between the power supply line and the second data line;
a first power supply supplying the initialization voltage to one end of the power supply line; and
a second power supply supplying the initialization voltage to another end of the power supply line, wherein
in a first period, the first switch and the third switch are OFF and the second switch and the fourth switch are ON, and
in a second period subsequent to the first period, the first switch and the third switch are ON and the second switch and the fourth switch are OFF.

3. The display device according to claim 1, wherein
in plan view, a first pixel circuit disposed corresponding to the first data line and a second pixel circuit disposed corresponding to the second data line are disposed between a data signal output circuit that outputs the data signal, and the second capacitance element and the fourth capacitance element.

4. The display device according to claim 2, wherein
in plan view, a first pixel circuit disposed corresponding to the first data line and a second pixel circuit disposed corresponding to the second data line are disposed between a data signal output circuit that outputs the data signal, and the second capacitance element and the fourth capacitance element.

5. A display device comprising:
a first power supply and a second power supply having an initialization voltage;
a first supply line that is electrically coupled to the first power supply and to the second power supply and that is supplied with the initialization voltage;
a pixel circuit provided corresponding to a data line;
a first switch that controls electrically connecting between the first supply line and the data line;
a third power supply and a fourth power supply having a reference voltage;

a second power supply line that is electrically coupled to the third power supply and to the fourth power supply and that is supplied with the reference voltage;

a capacitance element having one end, the one end of the capacitance element electrically coupled to the data line; and a second switch that controls electrically connecting between the second power supply line and another end of the capacitance element, wherein the first power supply supplies the initialization voltage to one end of the first supply line, the second power supply supplies the initialization voltage to another end of the first supply line, one end of the first switch is electrically connected to the data line and another end of the first switch is electrically connected to the first supply line, the third power supply supplies the reference voltage to one end of the second power supply line, and the fourth power supply supplies the reference voltage to another end of the second power supply line.

6. The display device according to claim 5, wherein in plan view, the first supply line is disposed along a first direction, and in the first direction, the first power supply line is disposed between the first power supply and the second power supply.

7. The display device according to claim 6, wherein in plan view, the second supply line is disposed along the first direction, and in the first direction, the second power supply line is disposed between the third power supply and the fourth power supply.

8. An electronic apparatus comprising:

the display device according to claim 5.

* * * * *